(12) United States Patent
Gurevich

(10) Patent No.: US 6,499,036 B1
(45) Date of Patent: Dec. 24, 2002

(54) METHOD AND APPARATUS FOR DATA ITEM MOVEMENT BETWEEN DISPARATE SOURCES AND HIERARCHICAL, OBJECT-ORIENTED REPRESENTATION

(75) Inventor: Michael N. Gurevich, Walnut Creek, CA (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 09/132,813

(22) Filed: Aug. 12, 1998

(51) Int. Cl.[7] .............................................. G06F 17/00
(52) U.S. Cl. ...................................... 707/103 R; 707/1
(58) Field of Search ........................... 707/1, 2–6, 100, 707/101, 102, 103

(56) References Cited

U.S. PATENT DOCUMENTS

| | | | | |
|---|---|---|---|---|
| 5,313,633 A | * | 5/1994 | Tomita et al. ............... | 395/700 |
| 5,315,703 A | | 5/1994 | Matheny et al. ............ | 395/164 |
| 5,367,633 A | | 11/1994 | Matheny et al. ............ | 395/164 |
| 5,379,432 A | | 1/1995 | Orton et al. ................. | 395/700 |
| 5,430,875 A | | 7/1995 | Ma .............................. | 395/650 |

(List continued on next page.)

FOREIGN PATENT DOCUMENTS

EP          0 504 085 A1       9/1992

OTHER PUBLICATIONS

Cary, M.J. et al., (1995) "Towards heterogeneous multimedia information systems: the Garlic approach" in Proceedings Ride–Dom '95, Fifth International Workshop on Research Issues in Data Engineering–Distributed Object Management (cat. No. 95th8039), Los Alamitos, CA, USA, IEEE Comput. Soc. Press, pp. 124–131.

CORBAservices, *CORBAservices: Common Object Services Specification*, Chapter 5, Goals and Properties, Revised Edition (Mar. 31, 1995).

*Primary Examiner*—Hyung-Sub Sough
*Assistant Examiner*—Mary Wang
(74) *Attorney, Agent, or Firm*—Morrison & Foerster LLP

(57) ABSTRACT

Data moves between multiple, disparate data sources and the object-oriented computer programs that process the data. A data access server is interposed between the object-oriented programs and the data sources, and acts as an intermediary. The intermediary server receives requests for data access from object-oriented computer programs, correlates each request to one or more interactions with one or more data sources, performs each required interaction, consolidates the results of the interactions, and presents a singular response to the requesting computer program. The consolidated response from the intermediary server contains data items requested by the computer program, information regarding the hierarchical topology that relates the data items, and an indication of the possible object types that might embody the data items. The application program receives the consolidated response and builds an object hierarchy to embody the data items and to interface them to the rest of the application program. The class of an object used to embody data items is selected at execution time from a list of possible candidates.

49 Claims, 23 Drawing Sheets

U.S. PATENT DOCUMENTS

| | | | |
|---|---|---|---|
| 5,459,865 A | 10/1995 | Heninger et al. | 395/650 |
| 5,475,845 A | 12/1995 | Orton et al. | 395/700 |
| 5,499,343 A | 3/1996 | Pettus | 395/200.2 |
| 5,499,371 A | 3/1996 | Henninger et al. | 395/700 |
| 5,553,282 A | 9/1996 | Parrish et al. | 395/600 |
| 5,615,362 A | 3/1997 | Jensen et al. | 395/614 |
| 5,627,979 A | 5/1997 | Chang et al. | 395/335 |
| 5,659,723 A * | 8/1997 | Dimitrios et al. | 395/614 |
| 5,694,598 A | 12/1997 | Durand et al. | 395/614 |
| 5,706,506 A | 1/1998 | Jensen et al. | 395/614 |
| 5,761,538 A * | 6/1998 | Hull | 395/899 |
| 5,764,973 A | 6/1998 | Lunceford et al. | 395/601 |
| 5,765,159 A | 6/1998 | Srinivasan | 707/102 |
| 5,794,248 A | 8/1998 | Blackman et al. | 707/103 |
| 5,819,282 A * | 10/1998 | Hooper et al. | 707/103 |
| 5,829,006 A * | 10/1998 | Paravathaneny et al. | 707/101 |
| 5,857,183 A * | 1/1999 | Kableshkov | 707/3 |
| 5,890,161 A * | 3/1999 | Helland et al. | 707/103 |
| 5,903,652 A * | 5/1999 | Mital | 380/25 |
| 5,958,004 A * | 9/1999 | Helland et al. | 709/101 |
| 5,991,520 A * | 11/1999 | Smyers et al. | 395/280 |
| 6,151,357 A * | 11/2000 | Jawahar et al. | 375/228 |
| 6,182,156 B1 * | 1/2001 | Togawa | 709/316 |

\* cited by examiner

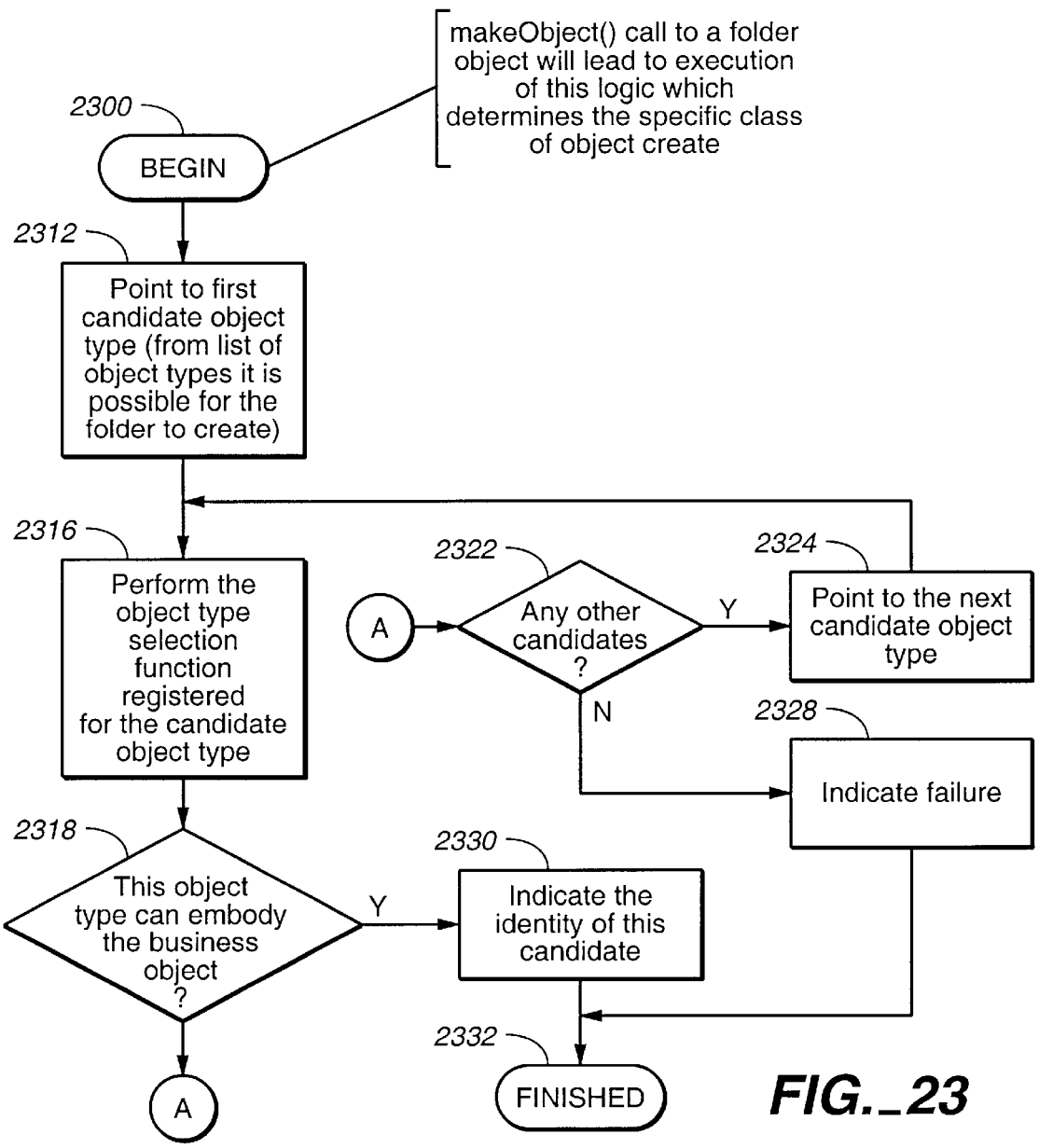
FIG._23

METHOD AND APPARATUS FOR DATA ITEM MOVEMENT BETWEEN DISPARATE SOURCES AND HIERARCHICAL, OBJECT-ORIENTED REPRESENTATION

BACKGROUND OF THE INVENTION

1. Field of the Invention

The invention relates to data processing systems; in particular data processing systems using object-oriented computer programs to access managed data.

2. Description of Related Art

Large, modern business organizations are in a constant state of flux. The makeup of the business organization changes with every merger, acquisition, and divestiture. Related data assets come and go accordingly. The rapid pace of change represents a difficulty in keeping enterprise computer applications in synchronization with the changing set of disparate data sources with which they may be forced to contend.

Modern business enterprises face another challenge in matching their computer applications to their data assets. The majority of data assets are maintained using traditional data management systems and techniques. Some reasons for this are the huge investment made in building and maintaining the existing assets, the proven reliability of the existing systems, and the cost of migrating to more modern systems. Object oriented databases are on the horizon, moving from the laboratory to the field, but have yet to make serious inroads to widespread commercial use. But while structured data management systems have lagged in adopting an object-oriented design paradigm, commercial application software designs have fully embraced it. Use of object-oriented programming languages, such as C++ and Java proliferates. Thus, modern business organizations face a schism between the design paradigm underlying their application software and the design paradigm managing the data on which the software is to operate.

Attempts have been made to bridge the gap between legacy data management systems and object oriented programs. U.S. Pat. No. 5,499,371 (Henninger), for instance, discloses method and apparatus for automatic generation of object-oriented source code for mapping relational data to objects. The invention of Henninger can greatly speed the work of a programmer by automatically generating source code that supports a fixed correspondence between object classes of the source code and the data fields managed by a traditional structured database system. The resultant source code is combined with other source code created by the programmer and compiled into an executable computer program. Changes at the structured database can, however, necessitate regeneration of the object class source code and recompilation of every program in which it is incorporated. This threatens a software maintenance burden to the dynamic business organization. Consequently, there is a need in the art to bridge the gap between the multiple, disparate, and ever-changing data sources of a business and its object-oriented application software, while minimizing the impact of, and maximizing the flexibility in responding to, changes in the data source makeup.

SUMMARY OF THE INVENTION

The present invention is directed to the movement of data between multiple, disparate data sources and the object-oriented computer programs that process the data. A data access server is interposed between the object-oriented programs and the data sources, and acts as an intermediary. The intermediary server receives requests for data access from object-oriented computer programs, correlates each request to one or more interactions with one or more data sources, performs each required interaction, consolidates the results of the interactions, and presents a singular response to the requesting computer program. The consolidated response from the intermediary server contains data items requested by the computer program, information regarding the hierarchical topology that relates the data items, and an indication of the possible object types that might embody the data items. The application program receives the consolidated response and builds an object hierarchy to embody the data items and to interface them to the rest of the application program.

The class of an object used to embody data items is selected at execution time from a list of possible candidates. The same data access request, made by the same program, on two different occasions could result in objects of different classes being used to embody accessed data items because of a change in the data available over time.

A configuration database stores information about the types of data access requests that application programs can make to the intermediary server, the data sources with which the intermediary server interacts, and the types of interactions that are possible. The user of a computer program with a graphical user interface maintains the contents of the configuration database. The configuration database may include procedural scripts that permit detailed and conditional control over the work performed by the intermediary server to satisfy a data access request.

Embodiments employing the present invention may permit an application program to progressively augment a programming object with data items retrieved over multiple data access requests to the intermediary server. Moreover, the process of augmentation may result in some embodiments in the mutation of the underlying object from one class to another. In this way, the set of behaviors for a programming object can adapt to match the set of data items the object contains.

These and other purposes and advantages of the present invention will become more apparent to those skilled in the art from the following detailed description in conjunction with the appended drawings.

BRIEF DESCRIPTION OF THE DRAWINGS

FIG. 23 is a flowchart showing an alternative object-type selection process.

Where the same element appears in more than one figure, the same number designates the element is each figure.

DETAILED DESCRIPTION

Operational Overview

The present invention is useful in moving data items between their locations in permanent storage and locations in temporary storage where they can be manipulated by user application programs. Permanent storage, also known as persistent storage, maintains data over time, i.e., from one computing session to another. Permanent storage in a computer system may physically reside on mass storage devices such as magnetic disks. Temporary storage, also known as transient storage, maintains a data item for the time that it may be actively used and manipulated by an executing computer program. Temporary storage in a computer system may reside in the main memory devices of a computer such as DRAM integrated circuits, well known in the art. User application programs contain computer instructions in a logical arrangement that carries out the data processing work required by the user.

A modern user application program seldom contains the specific computer instructions to directly access data items on the physical storage devices where the data items permanently reside. Rather, a modem user application program invokes the execution of computer instructions contained in external software, such as an operating system or database manager, to mediate between a copy of the data item in permanent storage and a copy of the data item stored in temporary storage for the particular benefit of the user application program.

Figure 1:
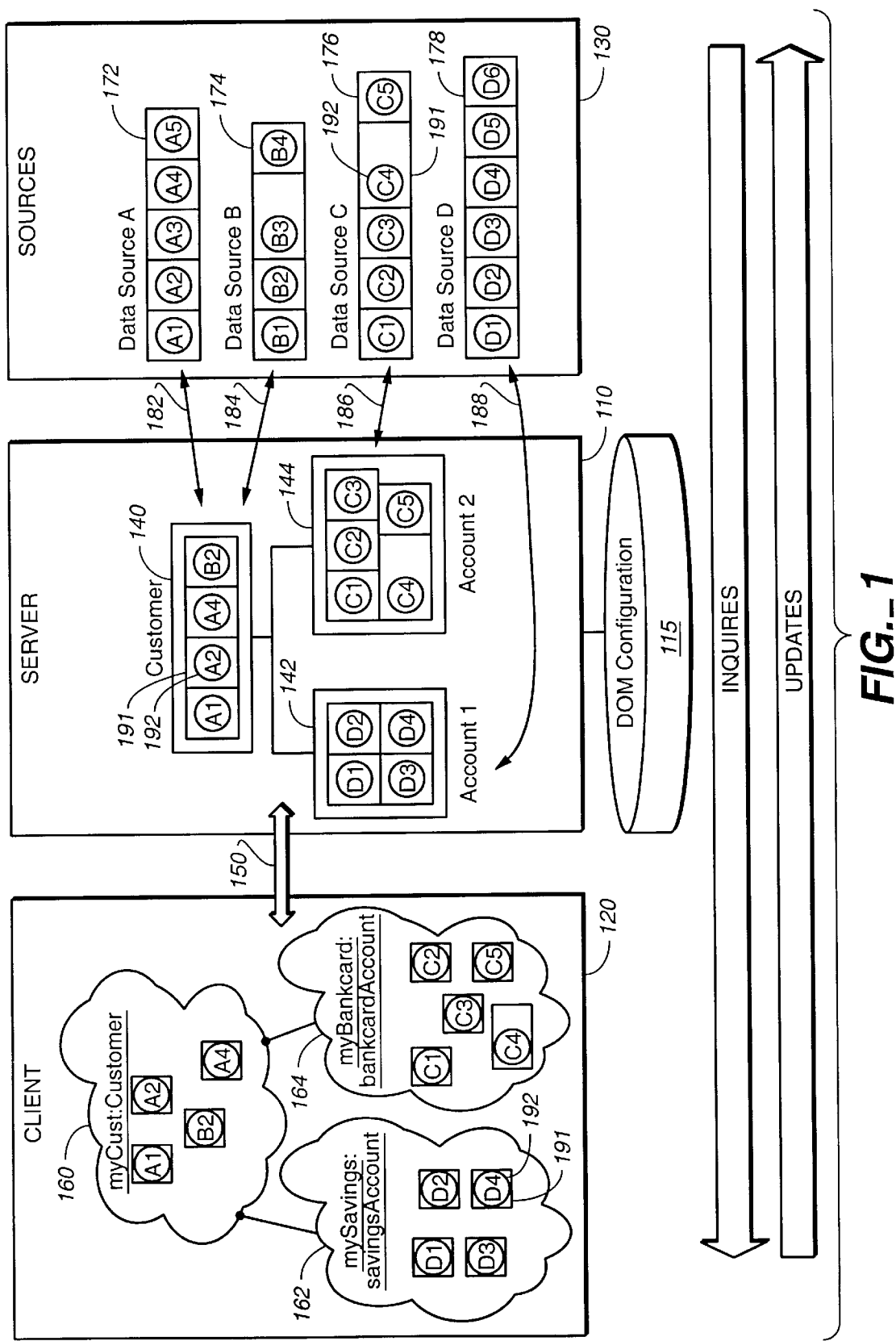
FIG. 1 depicts an operational overview employing the invention.

FIG. 1 depicts the conceptual operation of data item movement between persistent and transient storage utilizing the present invention. Data items in FIG. 1 are depicted as circles, e.g., 192. A data item is the value stored in a field. Fields in FIG. 1 are depicted as the rectangular boxes, e.g., 191, that immediately surround data items, e.g., 192. A field is a physical unit of data designated to contain a value having a certain meaning. To illustrate, five contiguous bytes of permanent storage may be designated to contain a postal code and may presently store the value "94105". In this example, "94105" is the data item, and the five contiguous bytes are the field. A field may also comprise certain inherent or ascribed attributes, such as type, length, and data format. In the previous example, "postal code" is the field type, 5 bytes is the field length, and "numeric" is the field data format. The attributes of a field may apply equally to a data item stored in the field. For example, the "94105" data item has a length of 5 bytes.

FIG. 1 depicts that, by operation of data movement employing the present invention, a client computer 120 executing a user application program may have a transient working copy of a data item, e.g., A1 embodied by an object-oriented programming object 160. The persistent copy of data item A1 is maintained in a persistent storage record 172 by external software, e.g., Data Source A.

More specifically, FIG. 1 depicts that a plurality of transient data items embodied by programming objects 160–164 on client computer 120, are persistently maintained by multiple independent data sources 172–178. Object 160 embodies data items A1, A2, A4 and B2. Data items A1, A2, and A4 are maintained in persistent record 172 by Data Source A. Data item B2 is maintained in persistent record 174 by Data Source B. Object 162 embodies data items D1, D2, D3, and D4 which are maintained in persistent record 178 by Data Source D. Object 164 embodies data items C1, C2, C3, C4, and C5 which are maintained in persistent record 176 by Data Source D. In summary, 3 programming objects embody transient data items maintained among the persistent records of 4 different data sources; and a single object may embody transient data items from more than one data source, e.g., object 160. It is noteworthy that the present invention imposes no rigid correspondence, e.g., one-to-one, between the data items from a single data source or data source record, and the data items embodied by a programming object. This represents an advantage of the present invention.

To mediate between the transient and persistent copies of the plurality of data items embodied by programming objects 160–164 and maintained by the plurality of data source computers 130, client computer 120 engages in a single client-server (CS) transaction 150 with server computer 110. (A transaction comprises the generation of a request by a service-requestor computer program, the sending of the request to a service-provider computer program, processing of the request by the service-provider to generate a response, and the sending of the response from the service-provider to the service-requestor.) Server computer 110, processes the transaction request received from client computer 120 by engaging in a plurality of server-source (SS) transactions 182–188. Server computer 110 thus acts as a data access mediator between a client application program and data sources. Server computer 110 processes the transaction request utilizing information loaded into memory from a configuration database 115. Information from configuration database 115 permits interpretation of the CS transaction request and resolution to a corresponding set of SS transactions.

For example, consider the case where client computer 120 desires to retrieve data items illustrated for programming objects 160–164 from the data sources, i.e., to make an inquiry. Client computer 120 sends the request portion of a CS transaction 150 to server computer 110. Server computer receives the request, and identifies and interprets it based on information contained in configuration database 115. Information from configuration database 115 also informs server 110 as to the format of the response expected by client computer 120. Server 110 prepares to generate the response by building data container objects 140–144 with a topology that corresponds to the response format. In the presently described embodiment, the data container and response format topology also corresponds to a topology of relationships between programming objects 160–164 that will embody the data items in the client computer 120.

Program logic executing on server 110 resolves the request of CS transaction 150 down to atomic SS transactions 182–188. Server 110 initiates SS transaction 182 by sending a request to Data Source A that will return data items A1, A2, and A4 from persistent record 172. Data Source A may generate a response to server 110 that contains all of the data items from record 172, or only the requested data items. After Data Source A sends the response portion of transaction 182 to the server, program logic on server 110 will isolate the desired data items, i.e., A1, A2, and A4, out of the transaction 182 response and store them in container object 140. Server 110 then repeats the process for each of transactions 184, 186, and 188, sending a request to the data source, receiving the response, and moving data items as necessary into the appropriate data containers 140–144.

After the last SS transaction 188 is completed and its response data items D1–D4 have been moved into data container 142, server 110 transforms the data container contents and topology into a data stream. The resulting data stream is the response portion of CS transaction 150 that is sent from server 110 to client computer 120. Client computer 120 receives the response data stream that consolidates the multiple SS transaction 182–188 responses from the disparate data source computers 130. Program logic in software running on client computer 120 processes the data stream to extract the data items it contains and embody them in programming objects 160–164.

In a preferred embodiment employing the present invention, programming objects 160–164 are constructed as a result of processing the response data stream for CS transaction 150. The specific class used to instantiate a particular programming object is selected at instantiation time; i.e., dynamically during execution of the program and not statically during its development. (A class serves as the definitional model for the object to be created.) The class selected is determined by the field types of the data items contained in the response stream. For example, programming object 160 is instantiated from class "Customer" because of the field types associated with data items A1, A2, A4, and B2. If, for example, object 160 represents a banking customer, and data item B2 contains the customer's password, and an inquiry transaction 184 fails because record 174 was previously deleted so that no password data item is sent to the client computer in response to transaction 150, then programming object 160 may instantiate from the "UnsecureCustomer" class, rather than from the "Customer" class, because of the missing password data item. It is fundamental to object-oriented programming that the class of an object determines the properties it can maintain and the behaviors it can perform, which together determine its data processing characteristics. Instantiation under the UnsecureCustomer class could produce an entirely different set of behaviors for object 160 than instantiation under the Customer class, such as behavior that fails to authorize use of an automated teller machine. To pursue the example further, if transaction 150 occurs again for the same customer at a later time, and if record 174 had been restored in the meantime, then object 140 instantiates from the Customer class and normal ATM authorization resumes. The ability to determine object class at execution time based on the types of data items instantly available represents a further advantage of the present invention.

Operating Environment

Figure 2:
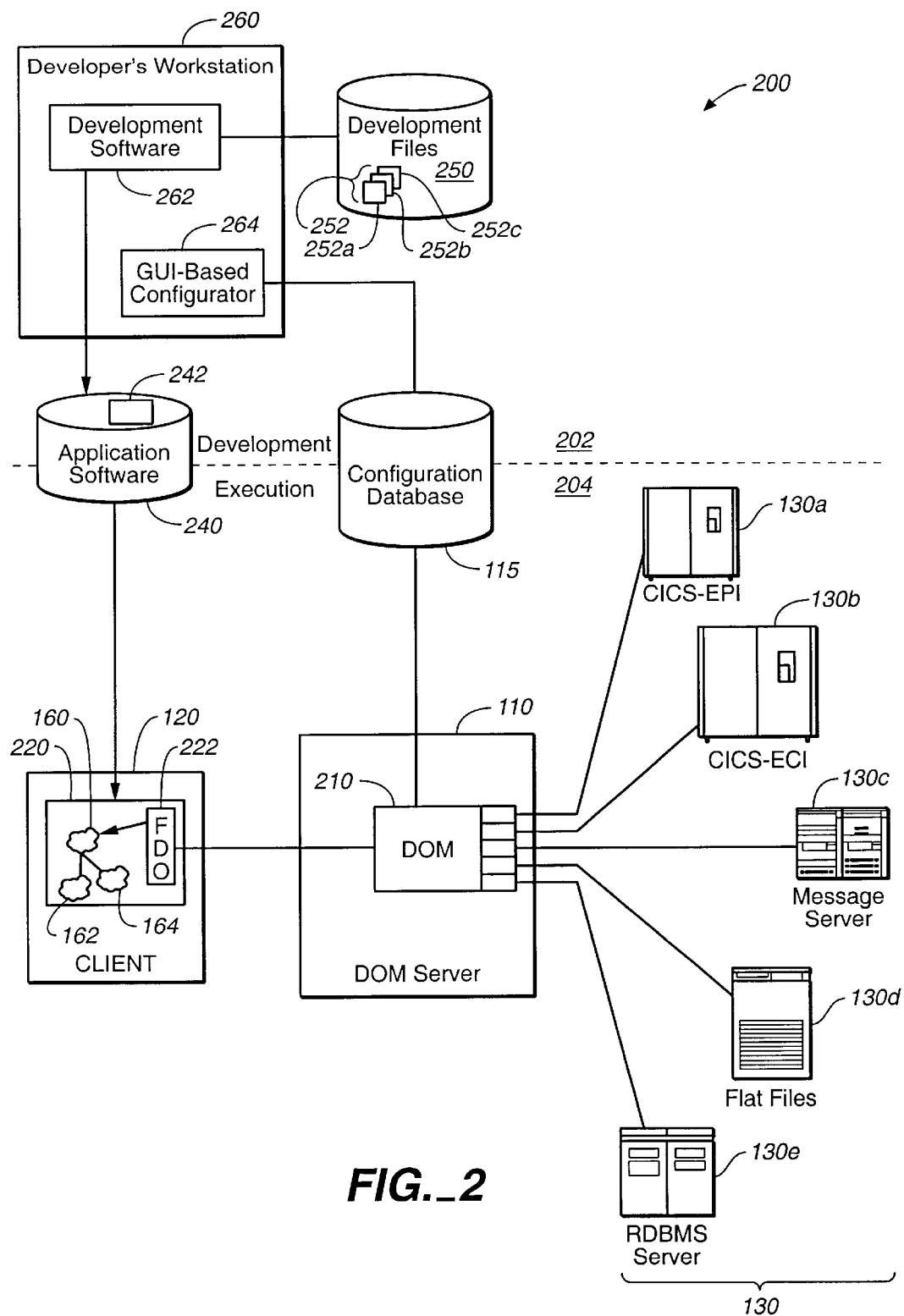
FIG. 2 depicts an operating environment for the present invention.

FIG. 2 depicts an operating environment for the practice of the present invention. Operating environment 200 supports the creation and execution of user application programs that can access data from disparate sources through the unified interface provided by an intervening server as previously described in relation to FIG. 1. The operating environment 200 is split between a development portion 202 and an execution, or run-time, portion 204. Development environment 202 includes developer workstation 260 and development files 250. Developer's workstation 260 includes development software 262 and GUI-based configurator software 264. Development files 250 includes libraries 252.

Execution environment 204 includes data source computers 130, server computer 110 and client computer 120. Server computer 110 includes DOM software 210. Client computer 120 includes application program 220. Data source computers 130 include data access software (not shown). Application program 220 includes program instructions of an FDO component 222 and programming objects 160–164.

Configuration database 115 and Application software 240 participate in both the development 202 and execution 204 portions of the operating environment 200. Use of the development environment 202 generally precedes use of the execution environment 204. The development environment 202 is used to create and maintain application software 240 and the configuration database 115. The application software 240 and configuration database 115 created and maintained by utilization of development environment 202 are used in the execution environment to control operation of the client 120 and server 110 computers, respectively.

Developer workstation 260 is a general purpose computer such as a desktop personal computer. A software developer uses developer workstation 260 to execute GUI-based configurator software 264 to create and maintain the contents of configuration database 115. The configuration database 115 contains information about how a client program 220 can request data services from the server 110, and how the server 110 can fulfill those requests using the disparate data sources 130. After knowing information loaded into configuration database 115, an application developer can use workstation 260 to create client application programs that will carry out transactions with server 110 when executed.

A programmer uses development software 262 to create an application program that will run on a client computer 120. Development software 262 may include source code editors, integrated development environments, language compilers, linkers, debuggers, and other tools used by programmers to develop software. In the preferred embodiment these tools support development in an object oriented language such as C++ or JAVA. Such tools are well known and understood in the art.

During the development process, the development software 262 creates, maintains, and uses various development files 250. Development files 250 may include, for example, source code, object code, executables, and related files. Development files 250 may also include libraries 252 of the above types of files in a form intended for generalized or standardized use, e.g., subroutine libraries or graphical control libraries. Development files may be originally created by the user, or come from the operating system software provider, a software vendor, or from another source. The types of files 250 used in the development of application programs are well known and understood in the art.

At the culmination of the development process for an application program, development software 262, such as a linker, creates a ready-to-use executable program 242 and stores it as application software 240.

In a preferred embodiment, development files 250 includes libraries of generalized source code files. The files in the libraries define and implement classes and objects that, when compiled with user source code into a ready-to-use executable program 242, effectuate a transmutation between data exchanged with the server 110, and object instances 160–164 in a running copy 220 of the persistently stored executable program 242. This transmutation process represents a further advantage of the present invention which is more fully discussed later in this detailed description.

Execution environment 204 is used to perform data processing desired by the user, for example, maintaining the user's customer accounts. Application software 240, such as persistently stored executable program 242, is loaded into client computer 120 to become executing program 220. Executing program 220 contains instructions 222 that initiate and respond to formatted transaction data streams exchanged with data object manager (DOM) server software 210. Notably, foundation for distributed objects (FDO) instructions 222 transmute between live programming objects 160–164 in executing program 220, and the contents of a data stream exchanged with the DOM server software 210. In a preferred embodiment, FDO instructions 222 result from program compilation in the development environment 202 using generalized source code files as contained in library 252.

In one such exchange, the FDO instructions 222 may send a data stream to the DOM server software 210 executing on the DOM server computer 110, that requests account data for a customer. DOM server software 210 receives the request, and interprets it based on information extracted from configuration database 115. DOM server software 210 acts as a data access Mediator between application program 220 and data sources 130. The interpreted request may resolve to one or more data requests sent to one or more of data sources 130. This process is described earlier in relation to FIG. 1.

Data source computers 130 are representative of the disparate types of data sources that can be accommodated in an embodiment employing the present invention. Data source 130a is a computer running IBM's CICS software and implementing its external presentation interface (EPI). CICS is a distributed online transaction processing system including system controller and utility software components that can support a network of many user display terminals interacting with user-written transaction programs. The EPI interface component allows programs external to CICS to access CICS transaction programs by emulating a display terminal device and its operator. The external program "reads" the screen display information by analyzing the data stream sent by CICS. The external program communicates to CICS by generating a data stream that mimics the keyboard strokes that would be sent by a terminal operator.

Data source 130b is a computer running IBM's CICS software and implementing its external call interface (ECI). The ECI interface component of CICS is designed for program-to-program communication, rather than program-to-terminal communication. The ECI interface allows an external program to invoke a CICS-managed transactional program module and communicate with it via a formatted data area.

Data source 130c is a computer running messaging system software that acts as the broker for transferring data "messages" between sender and recipient software programs. Message server data source 130c can be thought of as an email system for computer programs. One example is IBM's MQSeries software which can transmit and receive messages between programs running on heterogeneous systems; i.e. systems comprising hardware and software from various vendors and usually employing a variety of operating systems, communication systems, and protocols. Message server 130c acts as a data source by providing a mechanism whereby a data-using program can invoke the services of a data-maintaining program, but the message server software does not necessarily itself maintain a repository of business data.

Data source 130d is a computer running an operating system that provides access services for rudimentary file structures such as flat files. An example is a POSIX operating system providing access to files formatted as a standard UNIX text file.

Data source 130e is a computer running relational database management system (RDBMS) software. RDBMS software provides services to external programs for creating and maintaining data collections using a relational model. The relational model is well known and understood in the art. Examples of RDBMS's include ORACLE and INFORMIX products.

Notably, the bulk of electronic data processing occurring in business today utilizes data sources as those mentioned above 130. In addition to data, sources such as CICS systems 130a–b also embody the huge investment that has been made in application programming to capture and automate business logic (e.g., a transaction program running under CICS may perform many data processing operations other than merely retrieving or storing data such as editing, verifying, reformatting, accumulating, etc.). It is an advantage of an embodiment employing the present invention that the wealth of these legacy data sources can be accessed without any changes to the legacy system. This is possible because DOM server software 210 interfaces to each legacy data source using an interface standard defined by the data source, rather than one defined by the DOM software. It is a further advantage of the present invention that client programs can access this wealth of disparate data sources without each being aware of all of the details for accessing all of the available data sources, but can rather utilize the unified interface provided by the DOM server.

Figure 3:
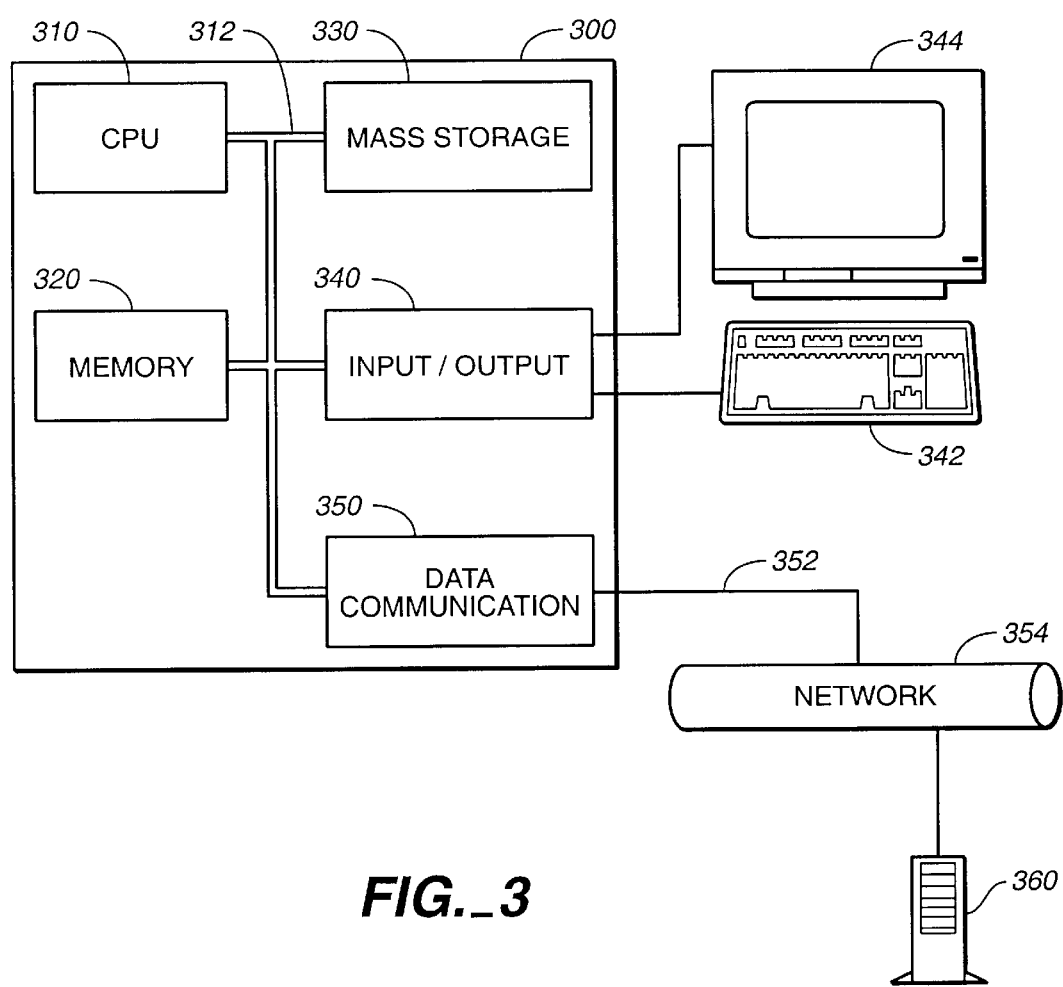
FIG. 3 depicts a general purpose computing platform for the practice of the invention.

FIG. 3 depicts a general purpose computing platform for the practice of the invention. General purpose computer 300 comprises CPU 310, signal bus 312, memory 320, mass storage 330, input/output 340, and data communication 350. Input/output 340 comprises keyboard 342 and video display 344. CPU 310 executes program instructions stored in memory 320 to process data stored in memory 320, and to control and effect the movement of data between and among memory 320, mass storage 330, input/output 340, and data communication 350. Memory 320 may receive, store, and recall computer software and data in a series of storage locations directly addressable by CPU 310. Example memory devices include ROM, RAM, DRAM, and SDRAM circuits. Memory 320 often comprises largely volatile storage devices, i.e., devices that retain their contents only so long as power is constantly supplied. Currently executing computer programs and transient business data are examples of computer software and data that are stored in memory 320.

Mass storage 330 similarly may receive, store, and recall computer software and data, but is generally slower and of much greater capacity than memory 320. Mass storage 330 generally comprises non-volatile, or persistent, storage devices. Mass storage 330 may comprise read/write and read-only devices. Example mass storage devices include those supporting and incorporating storage (recording) media such as magnetic disks, optical disks, magneto-optical disks, and magnetic tape. The storage media for the device may be fixed or removable. Program files, including operating system and application program files, configuration and management data files, and user data files are examples of computer software and data that reside on the storage media of mass storage 330.

Input/output 340 provides for human interaction with computer 300. Example input devices that allow a human operator to introduce data to signal bus 312 include keyboard, computer mouse, trackball, touch pad, digitizing tablet, and microphone. Example output devices that allow data from 312 to be presented to a human operator include video display, printer, and audio speakers.

Data communication 350 provides circuitry to exchange data on signal bus 312 of computer 300 with computers or other data devices attached to connection 352. While Input/output 340 provides for interaction with a human operator, data communication 350 provides for interaction with other computers. For example, data present in computer 300 may be conveyed via data communication circuitry 350 to computer 360, via connection 352 and network 354.

General purpose computer 300 is representative of the computing devices illustrated in FIG. 2 as Developer workstation 260, client computer 120, DOM server computer 110, and data source computers 130.

Architecture—Layered Design

Figure 4:
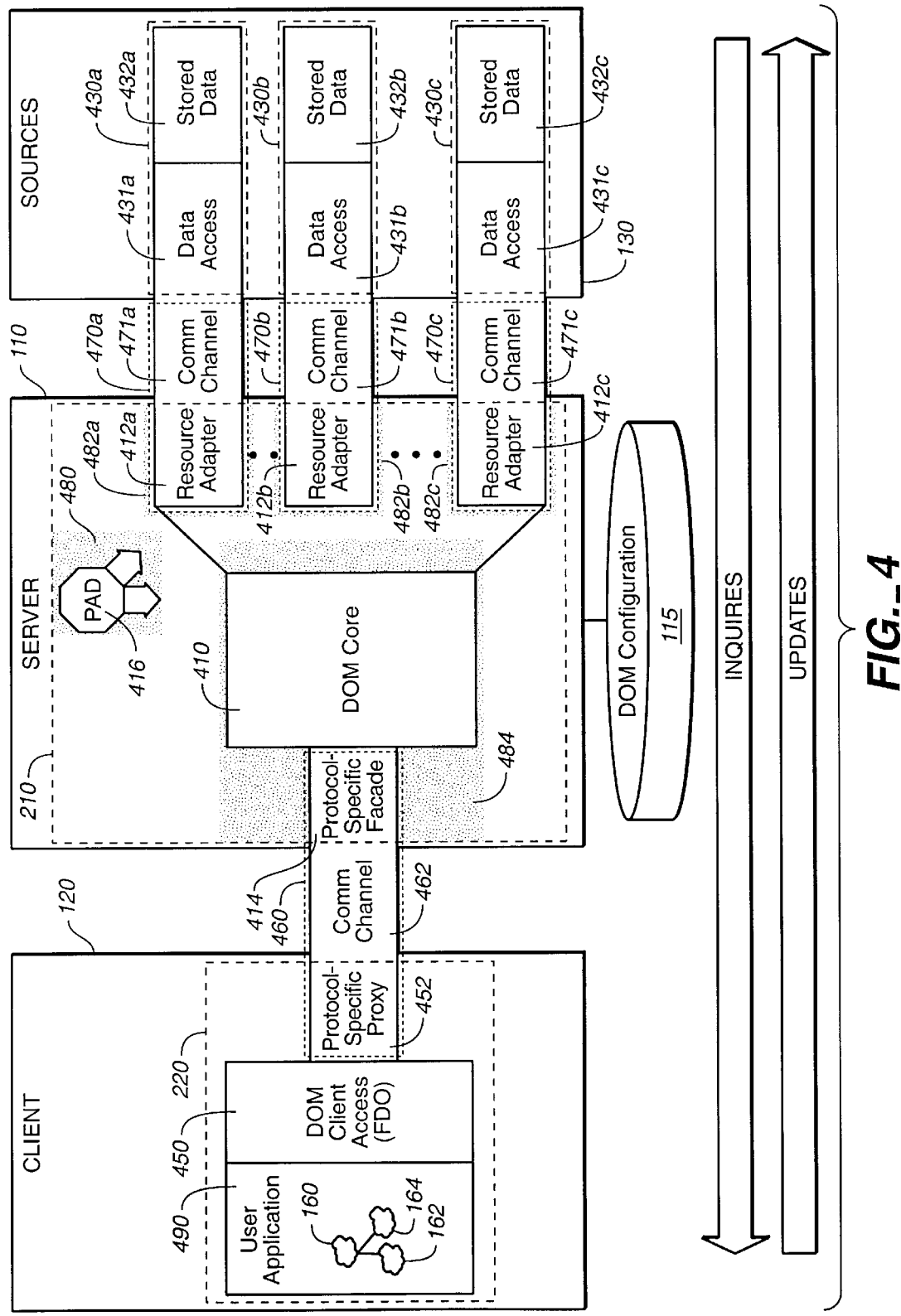
FIG. 4 depicts a functional architecture employing the invention.

FIG. 4 depicts a functional architecture employing the present invention. The described embodiment utilizes a layered architecture to mediate the end-to-end movement of data items. At one end is user application code 490 that manipulates a transient copy of a data item. At the other end are stored data 432 which contain persistent copies of data items. Intervening between the ends are a client transactor layer, a client-server (CS) communication layer, a server processor layer, a resource adapter layer, a server-source (SS) communication layer, and a data access layer. Client transactor layer comprises executing Foundation for Distributed Object (FDO) program code 450 that functions to interface user application code 490 to the request and response data formats and protocols required by the DOM server software 210. CS communication layer comprises CS communication channel 460 that functions to transfer request and response related data bi-directionally between the client transactor layer and the server processor layer. Server processor layer comprises DOM core program code 410 that functions to receive, process, and respond to transaction requests originating from user application program code 490. The server processor layer processes the requests it receives by initiating SS transactions with data sources 430. Resource adapter layer comprises resource adapters 412 that function to receive SS transaction requests from the DOM core and to conduct the requested transaction activity with an associated data source on behalf of, and under the direction of, the DOM core. SS communication layer comprises communication channels 471 that function to transfer SS transaction request and response related data bi-directionally between the resource adapter layer and the data accessor layer. Data accessor layer comprises data accessor programs 431 that function to maintain and manage the persistent data items contained in stored data 432.

It can be seen that a particular layer in a layered architecture can, itself, be divided into sublayers. For example, the CS communication layer comprises a proxy layer, a proxy-façade (PF) communication channel layer, and a façade layer. The proxy layer comprises protocol-specific proxy 452 that functions to interface the client transactor layer to the formats and protocols required by the particular PF communication channel in use. The PF communication channel layer comprises PF communication channel 462 that functions to transfer data bi-directionally between the proxy layer and the facade layer. The Façade layer comprises protocol-specific façade 414 that functions to interface the server processor layer to the formats and protocols required by the particular PF communication channel in use.

Computer elements depicted in FIG. 4 underlie and form part of elements already described in relation to the layered architecture. Computer elements depicted in FIG. 4 include client computer 120, server computer 110, and source computers 130. Client computer 120 and server computer 110 each provides general purpose computing circuitry and support software to execute associated program code in the architecture. Source computers 130 represent general purpose computers corresponding to data sources 130 in FIG. 2. Each of source computers 130 provides general purpose computing circuitry and support software to execute associated program code in the architecture, e.g., data accessor programs 431.

Other elements depicted in FIG. 4 operate together with those already discussed to serve the overall objective of data item transfer between data sources and user application programs. These elements include process activation daemon (PAD) 416, configuration database 115, and execution processes 480–484 which are described in the detailed structural and operational description of the architecture that follows.

Architecture—Detailed Description

The operational overview described in reference to FIG. 1 is repeated here with attention to the architectural components depicted in FIG. 4. Client computer 120 communicates with server 110 to gain access to persistent data maintained by data sources 130. Client computer 120 executes client application program 220 comprising user application program code 490, FDO program code 450, and protocol-specific proxy 452.

Application program code 490 includes program objects 160–164. Client computer 120 connects to server 110 via communication channel 460.

DOM server computer 110 executes DOM server software 210 comprising the program code of process activation daemon (PAD) 416, protocol-specific façade 414, resource adapters 412, and DOM core 410. DOM server computer 110 connects to data sources 430 via communication channels 470. DOM server software 210 executes using execution processes 480–484.

Data sources 430 comprise the executing program code of data accessors 431, and stored data 432. A data source such as data source 430a comprises the executing program code of data accessor software 431a, and the stored data 432a maintained by that code. A data source such as data source 430a corresponds to one of the data sources 130 depicted in FIG. 2.

User application code 490 includes program logic to carry out the specific data processing desires of the user. User application code 490 may include code to interact with the operator of client machine 120 via its input/output devices (see FIG. 3). Possibly in response to user input, part of the program logic of user application code 490 directs utilization of data items maintained in data sources 430. The program logic directing utilization of such data items connects to FDO program code 450.

FDO program code 450 includes generalized program logic for communicating with the DOM server software 210. The generalized program logic is tailored by development-time (e.g., compilation) or execution-time (e.g., variable assignment) processes to perform the instance-specific processing directed by the user application program 490.

In the presently described embodiment, when sending a service request to server software 210, FDO program code 450 transmutes programming objects, such as objects 160–164, into a data stream for transmission to the server. In receiving replies to service requests from server software 210, FDO program code 450 transmutes a data stream received from the server into programming objects such as objects 160–164. The details of this transmutation process are fully described later in this detailed description.

FDO program code 450 connects to the program code of protocol-specific proxy 452 to begin the exchange of a data stream with server software 210. Protocol-specific proxy 452 communicates with FDO program code 450 in a format used universally by FDO program code 450 to communicate with the CS communication layer elements of the architecture. This facilitates interchangeability of specific components occupying the CS communication layer in a specific implementation, particularly PSP 452. Protocol-specific proxy 452 converts data streams and related request and control information between the common FDO program code format and the format required by the communication channel to which it is connected 462.

Communication channel 462 connects protocol-specific proxy 452 to protocol-specific façade 414. Communication channel 462 supports the bi-directional transfer of data. Communication channel 462 may comprise a physical communication medium interposed between support circuitry and software at each end. The channel 462 may provide for communication between programs executing on the same computer, or on computers located thousands of miles apart. Examples of communication channels that may be employed in the presently described embodiment include TCP/IP network connections, Common Object Request Broker (CORBA) facilities, and Distributed Component Object Model (DCOM) facilities. These and other inter-program interaction and communication vehicles are well known and understood in the art.

Protocol-specific façade 414 converts data streams and related request and control information between the format required by the communication channel 462 to which it is attached and a format useable by DOM core program code 410. DOM core 410 communicates with protocol specific façade 414 in a format used universally by DOM core 410 to communicate with the CS communication layer elements of the architecture.

In the aggregate, protocol-specific proxy 452, communication channel 462, and protocol-specific façade 414 effectively form a client-server (CS) communication channel 460 between FDO program code 450 in the user application program and the core program code 410 of the DOM server 210 (i.e., the CS communication layer of the architecture). Furthermore, CS communication channel 460 in combination with the FDO program code 450, together represent a client-server interface that connects user developed code 490 with the DOM core 410. Program code implementing such client-server interface in an embodiment may advantageously adhere to an industry standard interface specification. For example, the FDO program code 450 on the client side of such a client-server interface could comply with an industry standard application programming interface (API) for data access such as open database connectivity (ODBC) or object linking and embedding (OLE).

DOM core program code 410 contains program logic to receive, process, and reply to requests received from client application program 220. When DOM core 410 receives a request, it uses information in the request data stream sent by the client to determine the action required to satisfy the request based on information loaded into memory from configuration database 115. The required action will resolve to one or more requests that need to be directed to appropriate data sources 430, i.e., SS transaction requests.

For each SS transaction request that needs to be directed to a data source, the DOM core 410 connects to program logic in one of resource adapters 412 to initiate the transaction with the associated data source. As to transactions between the DOM server software 210 and the data sources 430, the DOM server software acts as the client, and the data sources each act as a server. For example, the DOM core 410 connects to resource adapter 412a to begin an exchange with data source 430a. Resource adapter 412a communicates with DOM core program code 410 in a format commonly used by all resource adapters 412. Resource adapter 412a accepts requests in the common DOM format and performs the requested transaction by communicating with data source 430a in accordance with requirements imposed by communication channel 471a and data access software 431a.

Communication channel 471a connects resource adapter 412a to data access software 431a. Communication channel 471a is a bi-directional data communication channel. Communication channel 471a may comprise a physical communication medium interposed between support circuitry and software at each end. The channel 471a may provide for communication between programs executing on the same computer, or on computers located thousands of miles apart. Examples of communication channels that may be employed in the presently described embodiment include TCP/IP network connection and SDLC network connections. These and other inter-program communication and interaction facilities are well known and understood in the art.

Data access software 431a contains program logic to receive, process, and reply to requests received from DOM core 410. The requests received from DOM core 410 relate to accessing stored data 432a maintained by data access software 431a. When data access software 431a receives a request from DOM core 410, it interprets the request and may read, modify, insert, or delete certain contents of stored data 432a to satisfy the request. Data access software 431a also generates a response back to DOM core software, appropriate to the request.

Resource adapter 412a and communication channel 471a together operate as described above to give the DOM core access to data source 430a. Resource adapter 412b and communication channel 471b operate similarly to give the DOM core access to data source 430b. Resource adapter 412c and communication channel 471c operate similarly to give the DOM core access to data source 430c. In the presently described embodiment there are only practical limits, such as memory and CPU capacity, restricting the number of data access pipelines 470 associated with an executing DOM server 210. The ability of the DOM server 210 to simultaneously interact with multiple and disparate data sources represents a further advantage of the present invention.

The DOM server software 210 depicted in FIG. 4 also includes process activation daemon (PAD) 416. PAD 416 program logic loads and executes on server machine 110 to initiate operation of the DOM server software 210. PAD 416 reads configuration information from configuration database 115. Based on the information obtained from configuration database 115, PAD 416 starts multiple processes 482–484. Each process is viewed by the operating system software of server computer 110 as an independently manageable and dispatchable unit of work. PAD 416 starts processes 484, and 482a–c, to execute DOM core 314, and resource adapter 412a–c program logic, respectively. Starting each process includes loading the program code that directs the execution of the process. For example, starting process 484 includes loading DOM core program code 410 from mass storage into main memory.

PAD 416 program logic also monitors ongoing operation of the processes it starts, and will restart any process that terminates in accordance with restart information contained in configuration database 115. Such information may include, for example, an amount of time to wait before attempting a restart. In the presently described embodiment, PAD 416 also maintains a log file (not shown) where it records activity such as starts, terminations, and restarts of the processes it manages.

PAD 416 starts resource adapter processes 412a–c, after starting DOM core process 484 is shown. In the presently described embodiment one process 484 executing DOM core program logic 410. All inbound communication channels 462 from client machines, and all outbound communication channels 471a–c to data sources, connect to the single executing copy of DOM core program logic 410. In other embodiments, multiple processes running DOM core program logic may be started on a single server machine 110. Inbound requests from client machines and outbound requests to data sources may then be distributed among the multiple executing DOM core processes to manage or enhance performance. One skilled in the art recognizes that these and other variations can be made without departing from the scope and spirit of the invention.

Implementation Process

Figure 5:
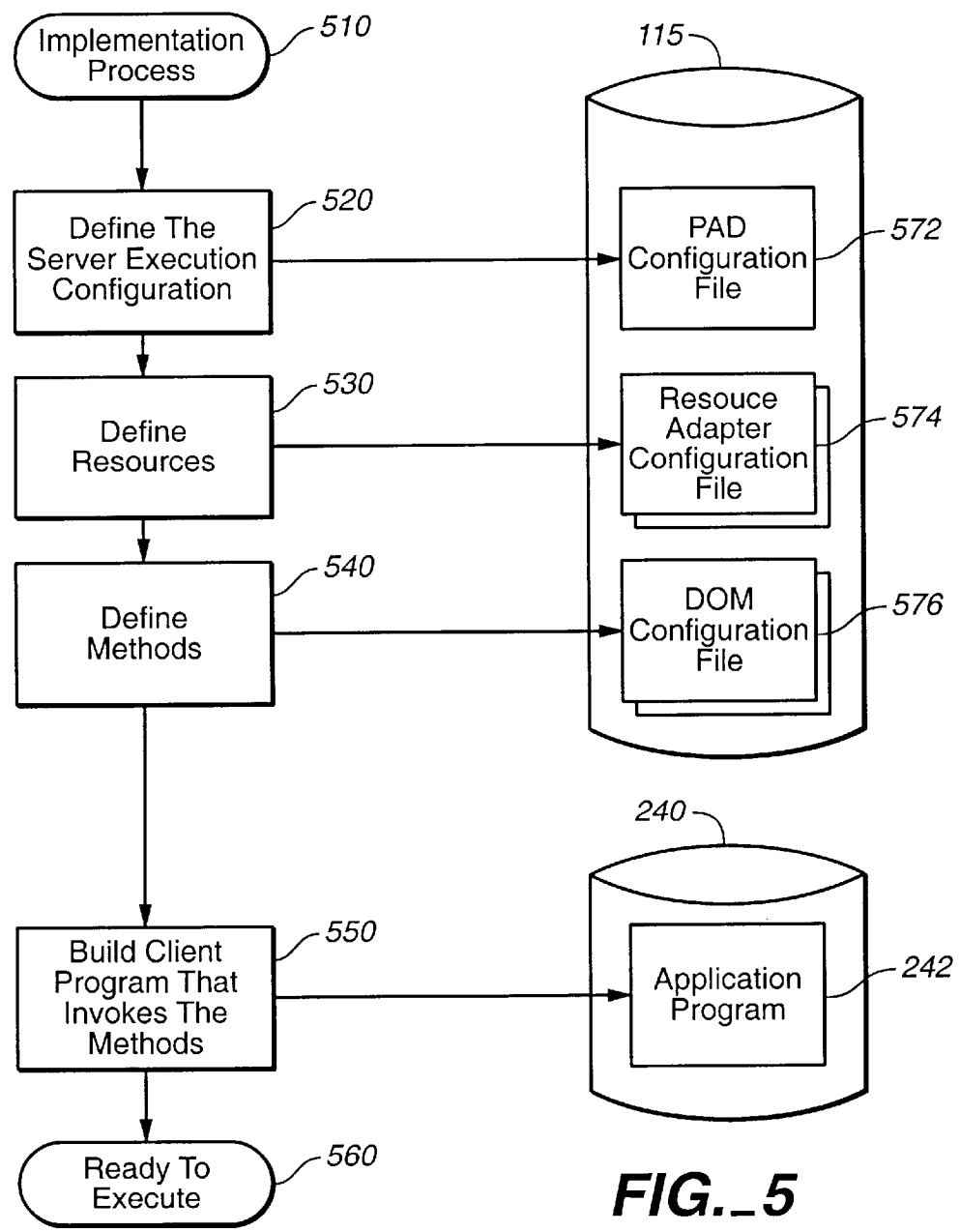
FIG. 5 is a flowchart showing the implementation process for one system employing the present invention.

Because an embodiment practicing the invention can provide a generalized data access capability, the specifics of any desired data access operation must be declared for the DOM server and the client application program. This is the implementation process. FIG. 5 is a flowchart showing the implementation process for one system employing the present invention. The implementation process prepares a data processing system to perform data accessing operations in accordance with the present invention. The implementation process occurs using the development environment 102 as described in relation to FIG. 1.

Steps 520 through 540 are performed using the GUI configuration utility described earlier. Steps 520 through 540 populate the DOM configuration database 115 which stores information used to direct the operation of the DOM server software during its execution. Step 520 records configuration information for the DOM server's Process Activation Daemon (PAD). Step 520 records its output in PAD Configuration file 572, which is contained in configuration database 115. PAD Configuration file 572 contains three sections. An ENVIRONMENT section contains information about the identity and location of computing resources on the server host. Such resources may include, for example, file directories or communication ports. RESOURCE ADAPTER and DOM sections contain information the PAD needs to start, control, and monitor resource adapter and DOM core processes. Such information may include, for example, a name that identifies a computer to run the process; an indicator whether restart should be attempted for a failed process; how many times, how often, and how long to wait for restart attempts; information the operating system should provide to the process if specifically requested; the command string to submit to the operating system to start the process; and the command string to submit to the operating system to restart the process. The RESOURCE ADAPTER and DOM sections may additionally include information to facilitate concurrent execution of multiple resource adapters or DOM cores on the server machine. Such information may include, for example, the number of DOM or resource adapter occurrences the PAD is to run.

Step 530 records configuration information used by executing resource adapters. DOM configuration "resources" as defined in step 530 refer to data sources. Each resource definition corresponds to a run-time resource adapter process and the SS transactions that the particular resource adapter can perform. The output of resource definition step 530 corresponding to a particular resource adapter goes to a particular resource adapter configuration file 574. Resource adapter configuration file 574 is contained in configuration database 115. Configuration database 115 in the presently described embodiment contains one resource adapter configuration file for each resource adapter specified in PAD configuration file 572.

A resource definition contains information concerning the resource adapter. For example, such information may include the type of data source to which the resource adapter connects; location, authorization, and interface information used to establish secure and reliable communication with the data source; and process management information about the resource adapter such as the amount of time to wait for initialization, restart parameters, environment information such as file directory names, a shell command for starting the resource adapter, and whether multiple, concurrent copies of the resource adapter may execute.

A resource definition also contains information concerning each particular SS transaction that the related resource adapter can accommodate.

For example, information about a transaction may include an identifier for the transaction type, parameters to control transaction execution, the format of the transaction request, the format of the transaction reply, the correspondence between transaction data items and DOM server data container data items, and procedural logic needed to conduct the transaction. Because different resource adapters can connect to different types of data sources, and because different data sources may each have their own particular defined interfaces, the specific information required to engage in a transaction may vary from data source type to data source type. In a preferred embodiment, each transaction definition corresponds to what the data source considers to be a single, atomic transaction. i.e., one request-process-reply sequence. The atomic transaction may also include required handshaking such as session set-up and tear-down.

"Methods" are defined in step 540. DOM Configuration "methods" refer to CS transactions. Each method definition corresponds to a type of CS transaction that a user application program may engage in with the DOM server. The output of method definition step 540 goes to a DOM Configuration file 576. DOM Configuration file 576 is contained in configuration database 115. Each method definition contains information needed by DOM core software to identify, process, and respond to a CS transaction request from a client user application program. Information about a transaction may include, for example, an identifier for the transaction type, parameters to control transaction execution, the format of the transaction request, the format of the transaction reply, the correspondence between transaction data items and DOM server data container data items, and procedural logic needed to conduct the transaction.

At the completion of steps 520 through 540, the DOM configuration database contains the information needed by DOM server software to manage its own operation on the server computer, define the data access transactions it will make available to its clients, and define the data access transactions it may conduct with data sources in order to satisfy client requests. Each of steps 520 through 540 must be conducted once before a fully functional DOM server can be executed using configuration database 115. Each of steps 520, 530, and 540 may then be repeated individually or in combination as needed to reflect additions or changes to the information contained therein.

Step 550 creates a client application program. The output of client program creation step 550 is an executable program 242 in mass storage that can be loaded and executed in a client computer. In a preferred embodiment, the client program is written by a computer programmer using an object-oriented computer language such as C++ or Java. The programmer includes source code in the program to send a request to a DOM server. The request is formulated to invoke a method defined in step 540. The source code is compiled and linked to form executable program 242. Application program 242 will control the operation of a client computer at execution time. After step 550, the implementation process is complete.

GUI-based Configuration

The implementation process described in relation to FIG. 5 begins by loading configuration information into files in a DOM configuration database. The files comprising the DOM configuration database in the presently described embodiment are stored in a text format. This format represents a compromise between a format optimized for human readability and a format optimized for machine readability. Storage of configuration files in text format permits a user to maintain the configuration files using any of the readily available text editor programs available on the particular server platform. Maintenance of the configuration files using a text editor is, however, error prone, and requires the user to have detailed knowledge about the many files that together comprise the configuration database. The presently described embodiment includes graphical user interface (GUI) based configurator software to provide easier, more understandable, less error-prone maintenance of the configuration database. The GUI-based configuration is described in relation to FIGS. 6 through 16.

Figure 6:
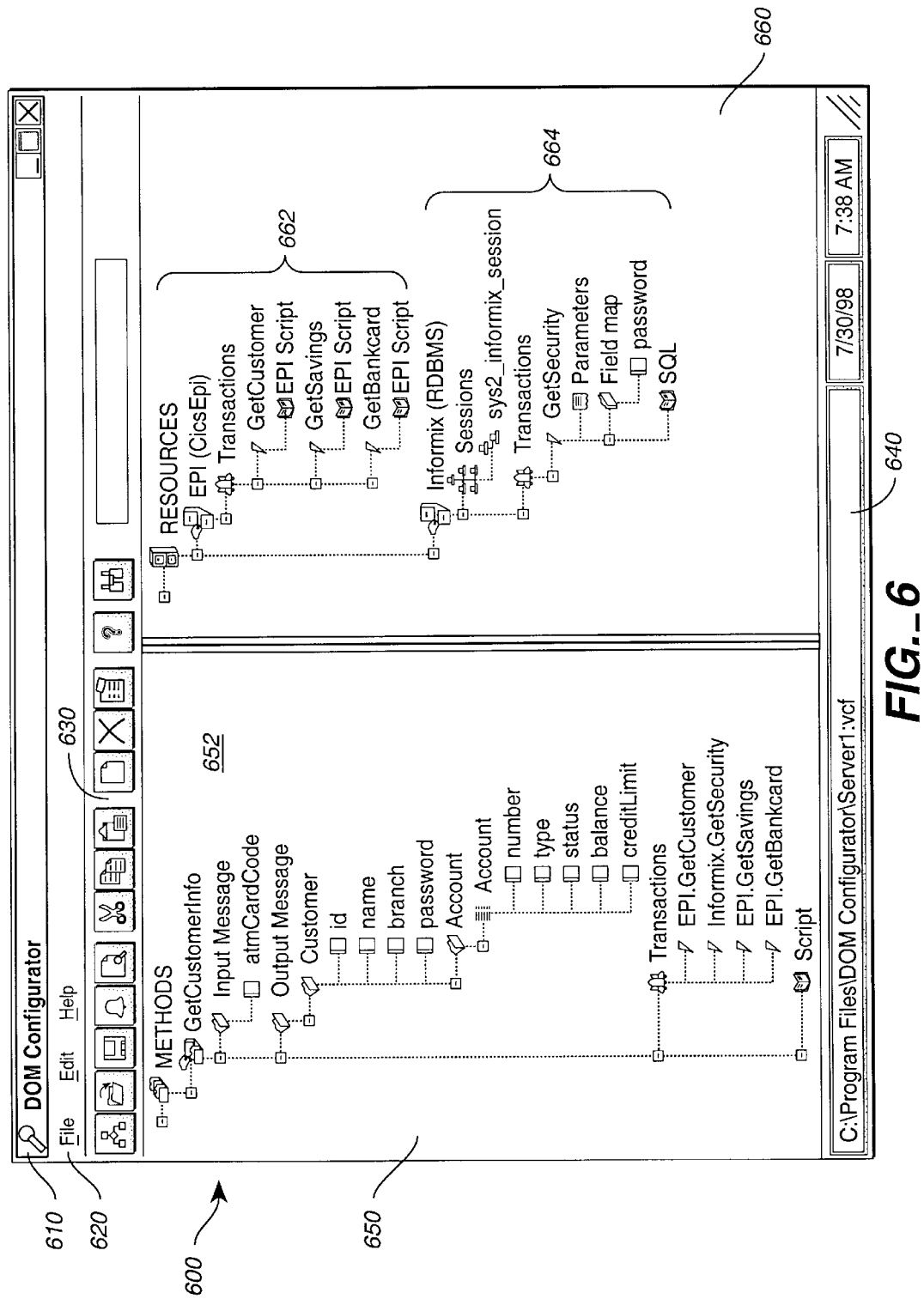
FIG. 6 illustrates the main screen display of a GUI-based configurator program.

FIG. 6 illustrates the main screen display of a GUI-based configurator program. Such a GUI-based configurator program may run, for example, under the Windows NT operating system from Microsoft Corporation. Main screen display window 600 comprises title bar 610, menu bar 620, tool button bar 630, status bar 640, methods display area 650 and resources display area 660. Windows, title bars, menu bars, tool button bars, status bars, and display areas are well known and understood in the art.

The leftmost portion of title bar 610 identifies the window as belonging to the DOM Configurator software. The rightmost portion of title bar 610 includes customary window control buttons to invoke window minimization, window maximization, and termination processing for the configurator program.

Menu bar 620 displays "File," "Edit," and "Help" options. Each menu option, when selected by a keyboard or pointer device, displays a list of functions that the user can perform using the configuration software. Functions listed under the File menu option principally relate to storing and loading configuration database information to and from mass storage devices. Functions listed under the Edit menu option principally relate to modifying configuration information that is graphically depicted as the visible content 652, 662, 664 of the method and resource display areas 650, 660. Functions listed under the Help menu option principally relate to displaying information about the DOM configurator software and its use.

Tool button bar 630 depicts an array of graphical icons, each of which may be selected by the user using a pointing device to invoke certain processing by the configurator program. An icon displayed on tool button bar 630 may correspond to a particular function in the list associated with a menu bar option. For example, a tool button bar 630 icon may invoke the same processing to save configuration information on a hard disk, as does a menu option listed under the File option of the menu bar 620. A tool button bar 630 may include icons to invoke processing that creates a new configuration, loads an existing configuration from mass storage, stores a configuration to mass storage, presents a dialog window with which to edit PAD configuration file data, displays configuration data in text format, exchanges data with a clipboard facility, adds or deletes a configuration element in a display area (and its underlying data), presents a dialog window with which to modify the data underlying a configuration element, displays helpful information, or that finds and highlights a particular configuration element.

Status bar 640 may display such information as the name and location of a configuration file on mass storage associated with the display contents 652, 662, 664 in method and resource display areas 650, 660. Status bar 640 may also display the current date and time-of-day.

Method display area 650 graphically depicts the configuration information associated with any DOM configuration file in a configuration database. This information defines and describes the client-server (CS) transactions available to a client application program through a DOM server. Resources display area 660 graphically depicts the configuration information associated with any resource adapter configuration file in a configuration database.

The visible contents 652, 662, 664 in the display areas 650, 660 shown in FIG. 6, and described in more detail in subsequent figures, illustrate one way to configure the operating example depicted and discussed earlier in relation to FIG. 1. The chief difference between the operating example of FIG. 1 and the configuration example of FIGS. 6 (and subsequent figures) is that the four data records 172–178 of FIG. 1 come from two data sources in the configuration example of FIG. 6, rather than from four data sources (A–D) as shown in FIG. 1.

Resource (SS Transaction) Configuration

Figure 9:
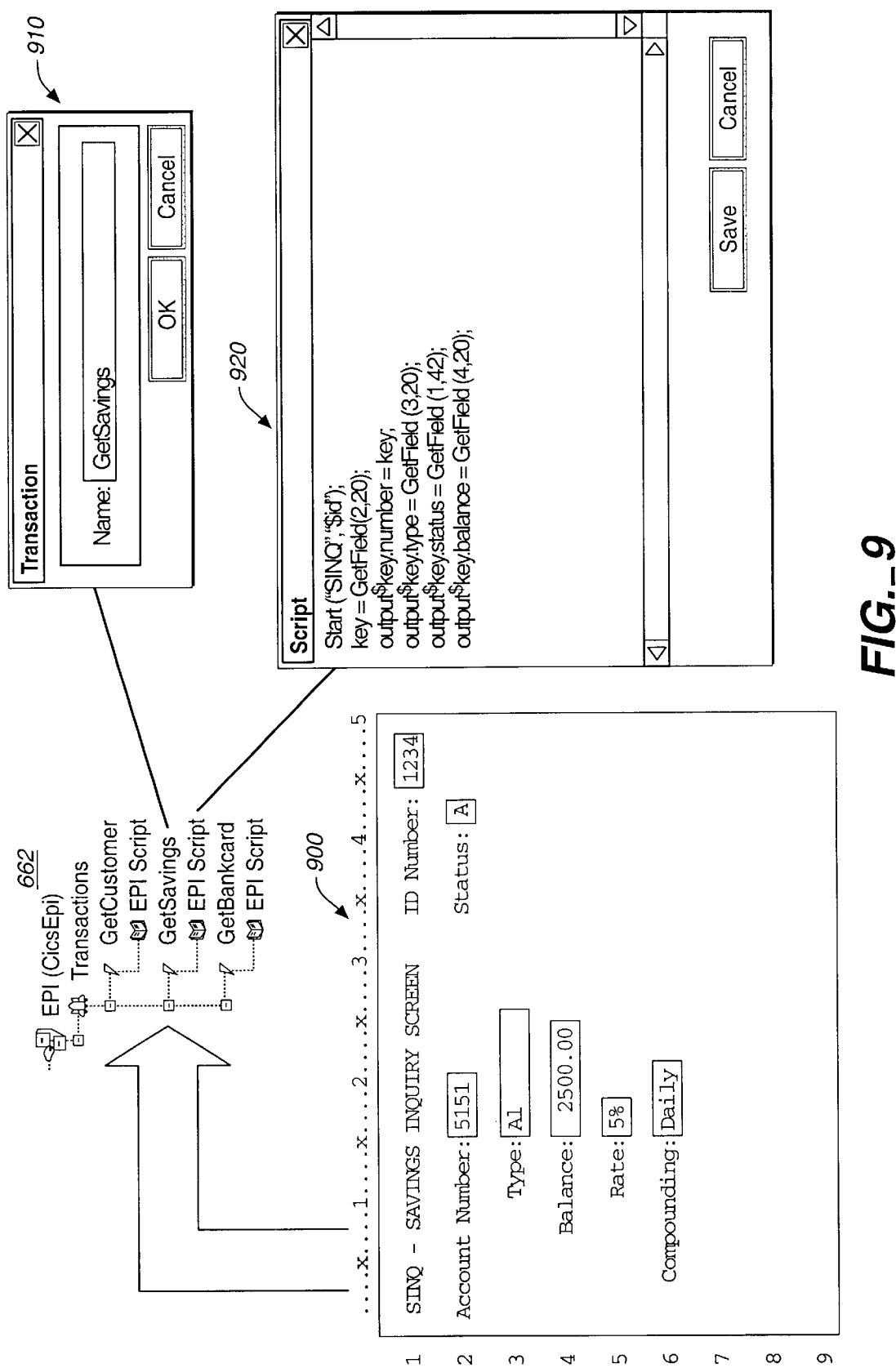
Figure 10:
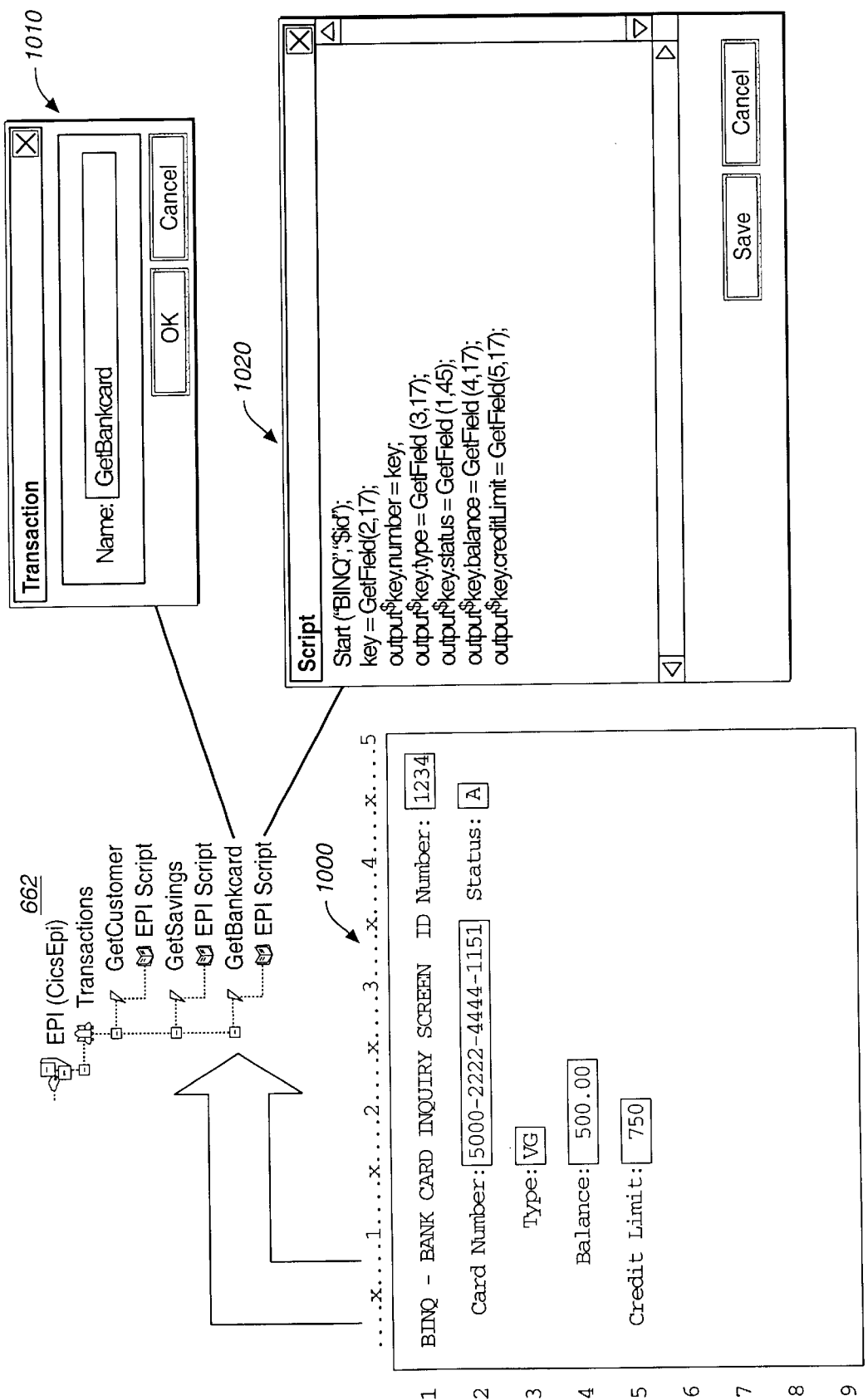
Figure 11:
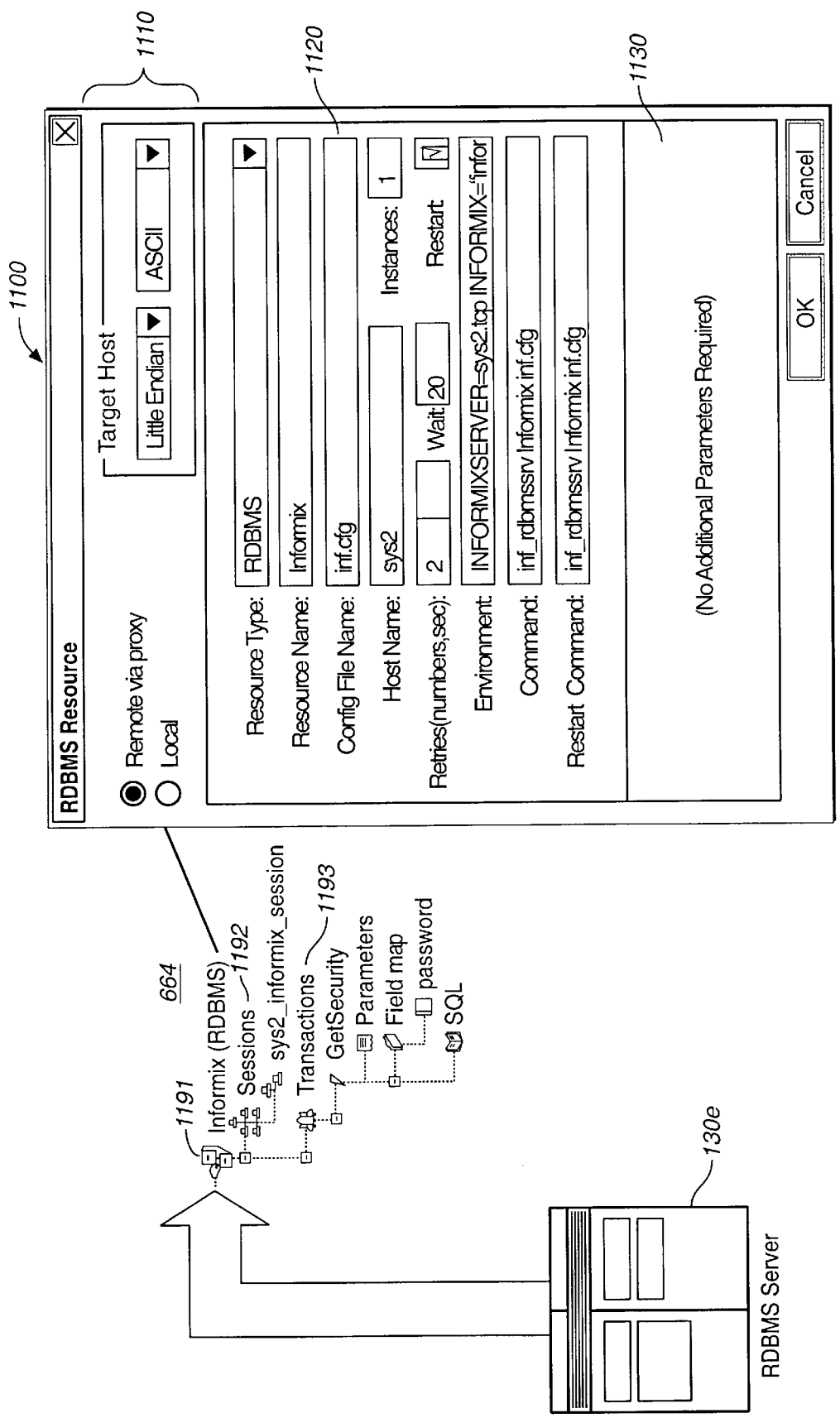
FIG. 11 illustrates the configuration of a relational database management software system (RDBMS) used as a data source.
Figure 12:
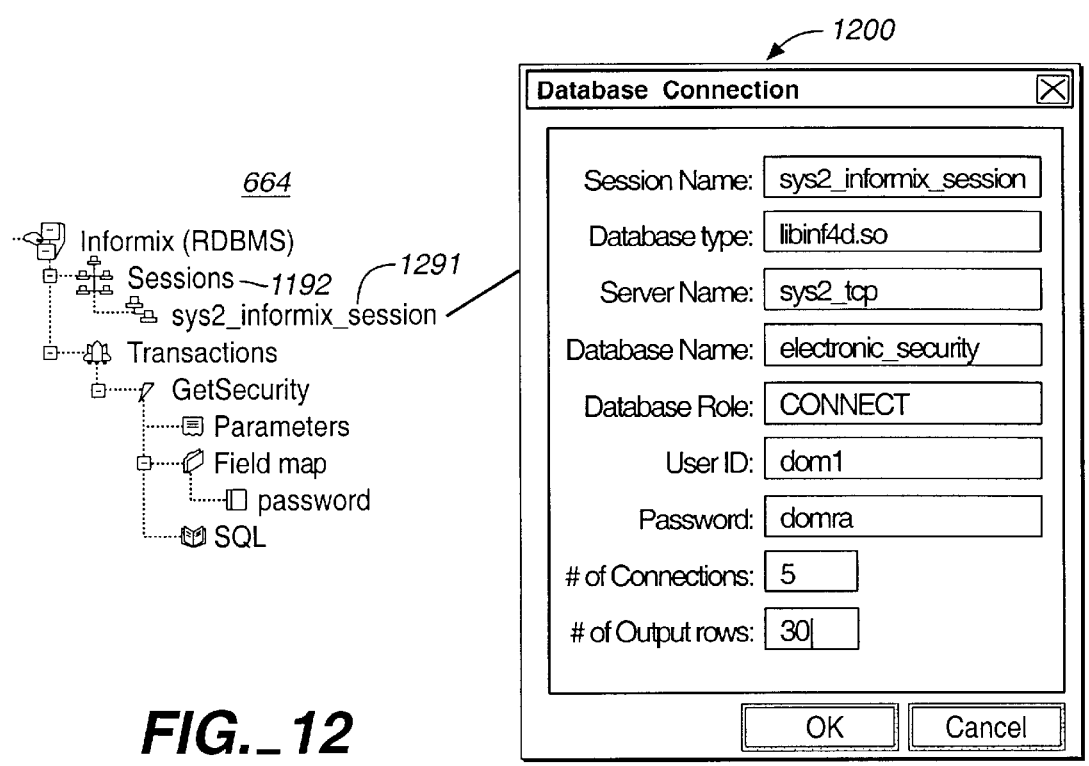
FIG. 12 illustrates the configuration of a session definition as may be required by RDBMS software.
Figure 13:
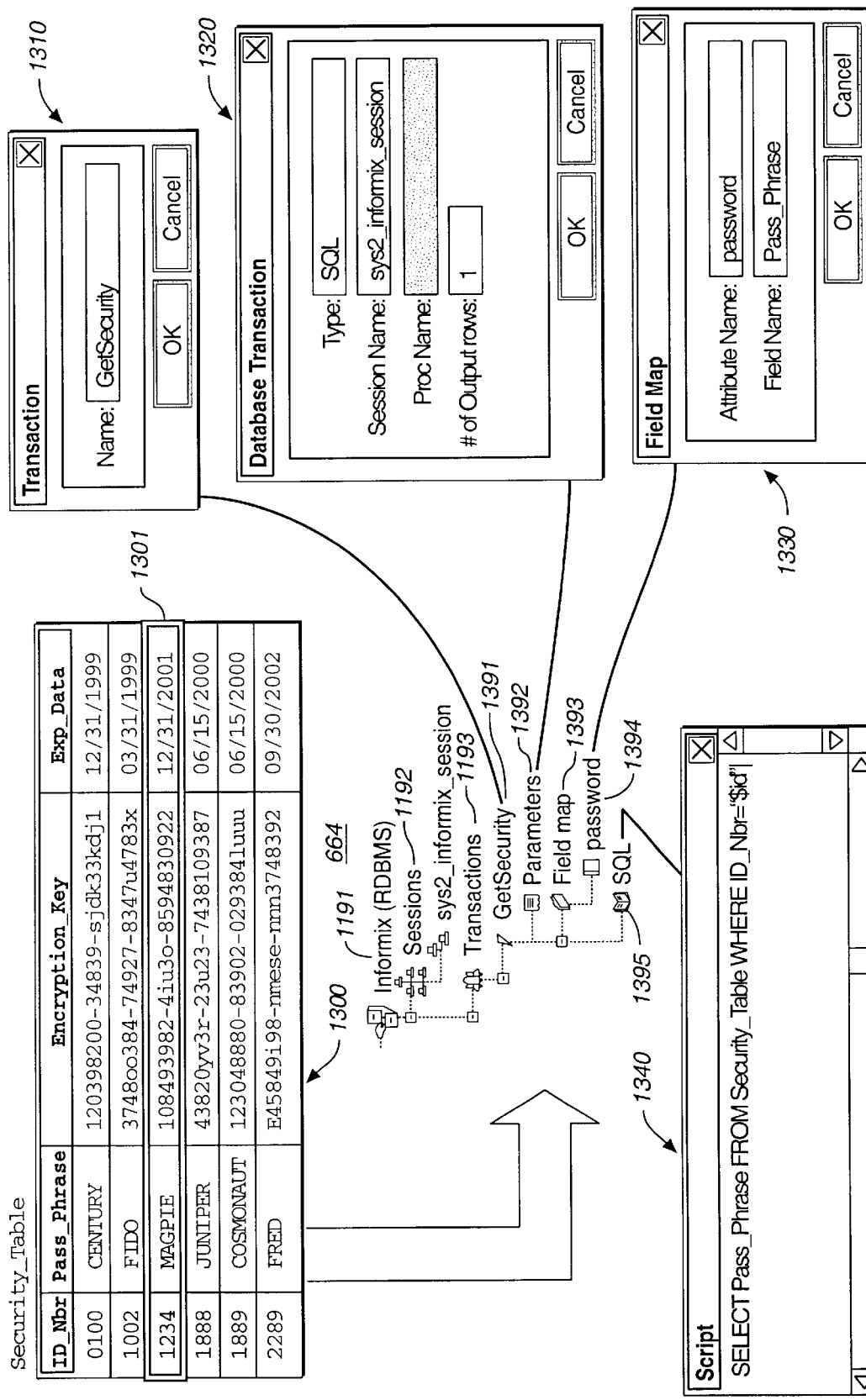
FIG. 13 illustrate the configuration of an SS transaction between a DOM server and an RDBMS data source.

FIGS. 7 through 13 illustrate GUI configuration for resource adapters and SS transactions. FIGS. 7 through 10 illustrate GUI configuration for a CICS-EPI resource and three associated SS transactions. FIGS. 11 through 13 illustrate GUI configuration for an RDBMS resource and one associated SS transaction. The configuration activity represented by FIGS. 7 through 13 corresponds to the activity represented by step 530 of FIG. 5.

Figure 7:
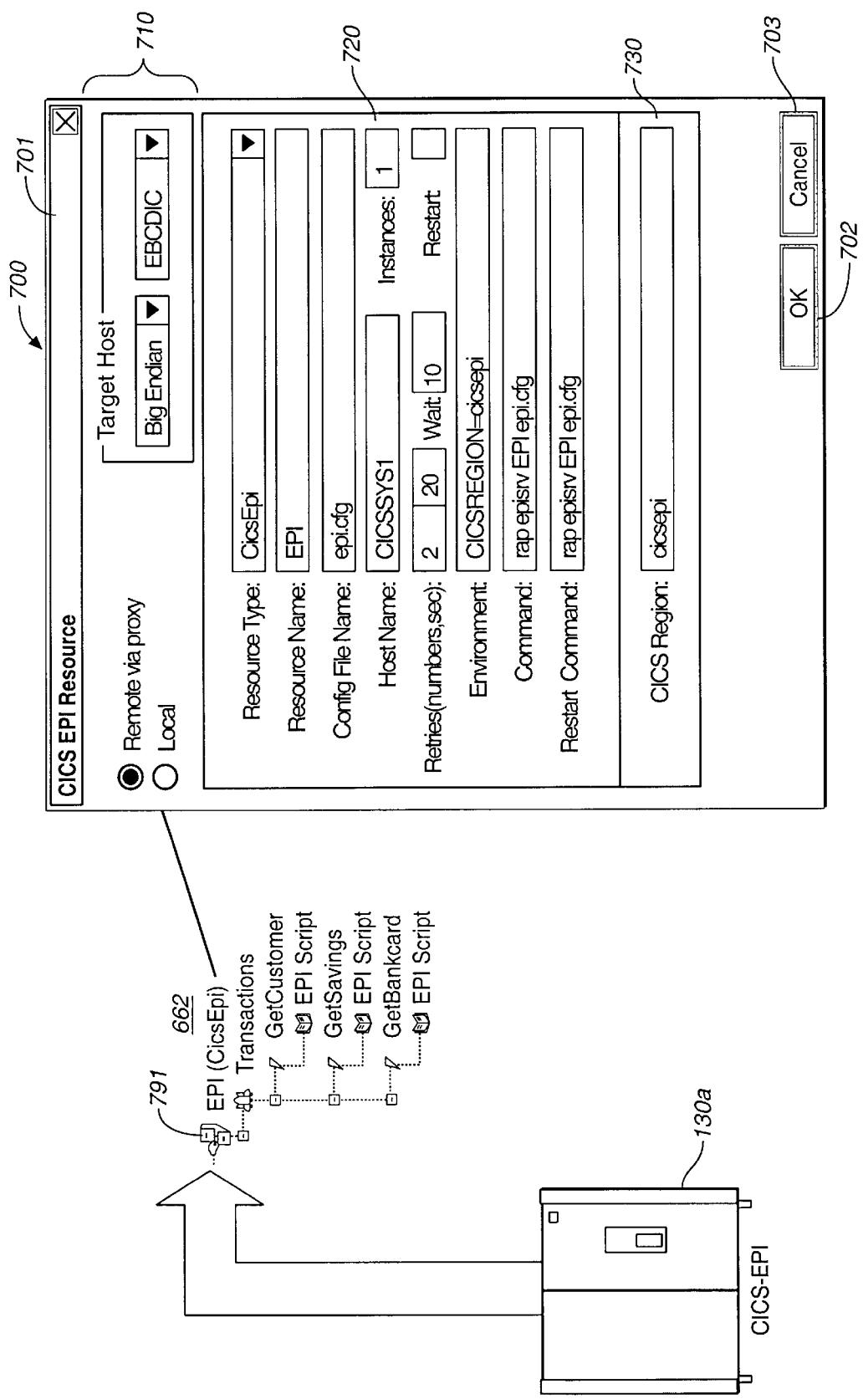
FIG. 7 illustrates the configuration of a transaction monitoring software system (CICS-EPI) used as a data source.

FIG. 7 illustrates the configuration of a transaction monitoring software system (CICS-EPI) used as a data source. The "EPI (CicsEpi)" element 791 of the visible contents 662 from the resource display area (660 of FIG. 6) of the DOM Configurator main screen (600 in FIG. 6) represents the configuration information for a CICS-EPI data source 130*a*. After adding element 791 to the resource display area, the user of the DOM Configurator displays dialog box 700 to view and modify the configuration information represented by element 791. Dialog box 700 comprises title bar 701, command buttons 702,703, execution environment information area 710, resource adapter management area 720, and resource adapter-specific information area 730. Title bar 701 displays the name of the type of resource adapter being configured. Command buttons 702 and 703 may be individually selected by the user using a keyboard or pointing device. Command button 702, when selected, invokes processing to terminate the display of the dialog box. Any changes made by the user to information displayed in the dialog box are saved during such termination processing. Command button 703, when selected, also invokes processing to terminate the display of the dialog box, but without saving any changes made by. the user.

Dialog box area 710 displays information about the execution environment of the target data source. Such information may include, for example, whether the data source resides on the same or different computer as the resource adapter software, or information about the coding methods used to represent data on the computer where the target data source executes.

Dialog box area 720 displays information principally used by the PAD software to manage any process executing a resource adapter using the instant configuration. The "Resource Type" field indicates the kind of data source to which the resource adapter connects. The "Resource Name" field indicates a name to be used by other software components to identify the resource adapter. The "Config File Name" field indicates the name of a resource adapter file in the configuration database where the instant configuration information is stored. The "Host Name" field indicates the name by which the data source computer can be contacted by software components attached to a common communication system. The "Instances" field indicates the number of concurrent resource adapters that may execute using the instant configuration information. The "Command" field indicates a command that the PAD may send to the operating system to initiate the resource adapter process. The "Restart Command" field indicates a command that the PAD may send to the operating system to attempt a restart of the resource adapter process after an earlier failure. The "Retries (number, sec)" fields indicate the number of times the PAD issues the restart command if the previous start or restart command fails within the specified number of seconds. The "Wait" field indicates the amount of time that PAD should wait after issuing a start or restart command to determine whether the command was successful. The "Restart" field indicates whether PAD should issue a restart command after detection of an earlier start or restart failure. The "Environment" field indicates information that the operating system should make available to the executing resource adapter software should it make a request for such information using operating system services.

The information displayed in area 720 of resource dialog box 700 is common to all types of resource adapters. Particular types of resource adapters may require that specific additional information be included in their configuration files. Display area 730 of resource dialog box 700 accommodates such information. For example, the "CICS Region" field indicates the name of a particular execution copy of CICS-EPI software running on the target data source computer.

Figure 8:
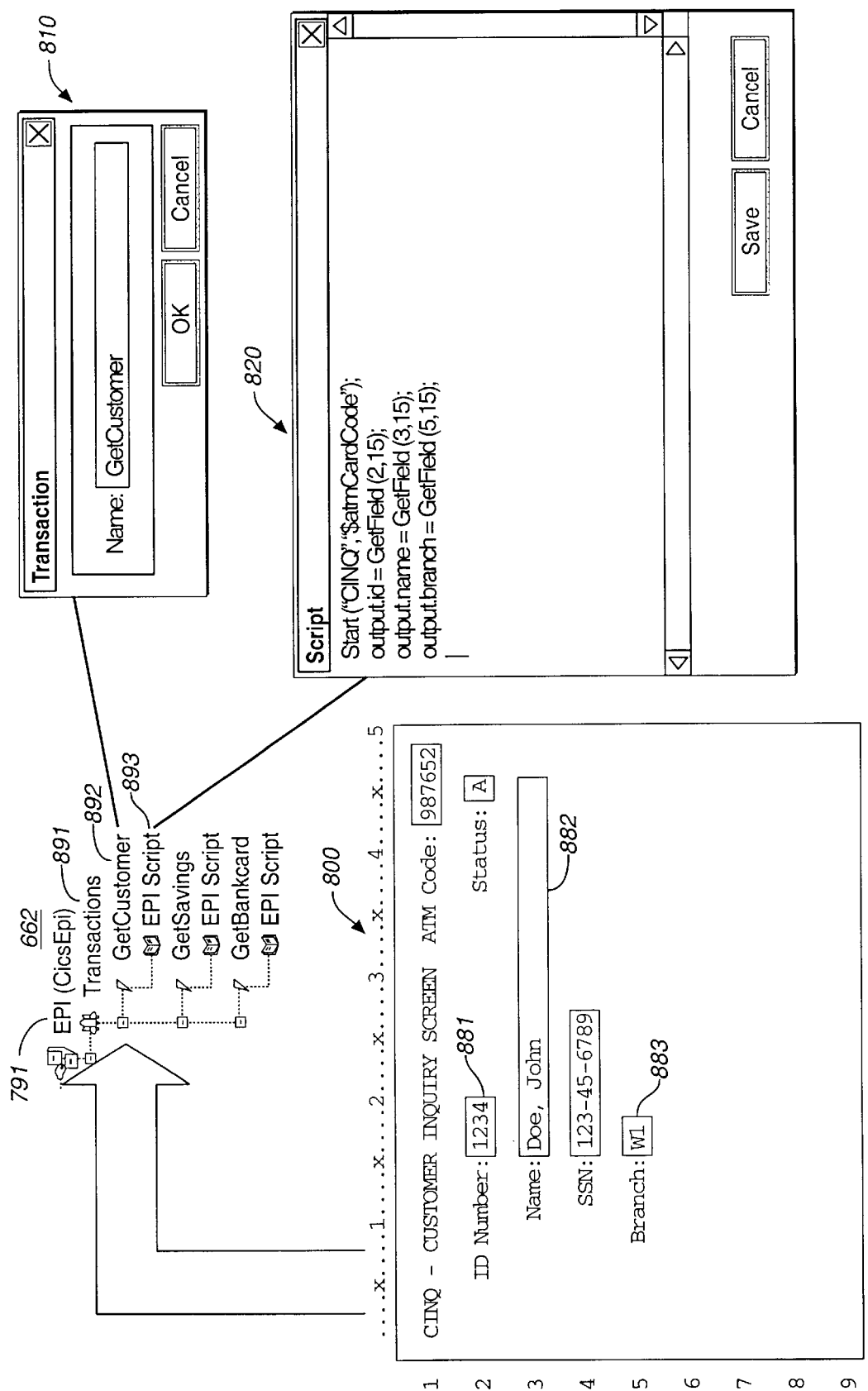
FIGS. 8 through 10 illustrate the configuration of SS transactions between a DOM server and a CICS-EPI data source.

FIGS. 8 through 10 illustrate the configuration of SS transactions between a DOM server and a CICS-EPI data source. FIG. 8 illustrates the configuration of an SS transaction for a CICS-EPI data source. When element 791 for the EPI data source is added to the resource display area at the specific request of the user, "Transactions" element 891 is automatically available for display. "Transactions" element 891 serves as the anchor point for a list of server-source (SS) transactions that the EPI resource adapter can process. The user of the DOM Configurator specifically adds the "GetCustomer" display element 892 to the transactions list anchored by element 891. When GetCustomer 892 is added to the transactions list, "EPI Script" element is automatically anchored off of GetCustomer element 892, because configuration information represented by the "EPI Script" element 893 is necessary to conduct an SS transaction with a CICS-EPI-type data source.

Dialog box 810 illustrates the configuration information immediately represented by GetCustomer element 892. A "Name" field indicates a transaction name by which the CS transaction is known within the configuration database. The transaction name must be unique within the resource adapter configuration to which it belongs.

Dialog box 820 illustrates the configuration information represented by "EPI Script" element 893. A script field contains procedural logic necessary to carry out the SS transaction. The procedural statements in the script emulate the actions of a computer terminal operator to the data source when executed. Such actions may include, for example, reading an item off the screen, entering an item using a keyboard, or depressing control keys on the keyboard. Data items read from, or keyed to, the emulated terminal screen go to, or come from, named variables or literal string. Named variables may reside within data container objects in the DOM core.

To start the CICS transaction suggested by the example script of dialog box 820, a terminal user would send a message to the EPI data source containing the transaction code to identify the desired transaction, "CINQ," followed by an ATM card number to identify the particular customer for which the transaction is being requested. The first line of the script in dialog box 820 duplicates this message format using a literal value for the transaction code ("CINQ"), and variable substitution for the ATM card information ("$atmCardCode"). After receiving such a message, the EPI data source responds with a data stream to produce screen image 800 for the terminal user to read. Screen image 800 corresponds to persistent data record 172 of FIG. 1. The EPI script in dialog box 820 "reads" the screen image data stream using the second and subsequent lines of the script. The second line reads field 881, and places the data item in a variable named output.id. Similarly the third and fourth lines read fields 882 and 883, and place the data items in variables named output.name and output.branch, respectively. Table 1 portrays EPI scripting language elements useful to emulate terminal operations.

TABLE 1

EPI Scripting Language Elements

| Language Element | Description |
| --- | --- |
| Start ( ) | This function starts the given transaction using the specified parameter string.<br>Start (Transaction Name, Parameter String); |
| Send ( ) | This Function simulates attention keys by sending data from the setField ( ) function to the transaction.<br>Attention key values are:<br>  PF1-PF24<br>  ENTER<br>  CLEAR<br>Send (Attention Key); |

TABLE 1-continued

EPI Scripting Language Elements

| Language Element | Description |
|---|---|
| Clear ( ) | This function clears the screen.<br>Clear ( ); |
| ClearUnprot ( ) | This function clears all unprotected fields on the screen.<br>ClearUnprot ( ); |
| SetCursor ( ) | This function positions the cursor on the screen using row/column coordinates.<br>setCursor (Row, Column); |
| Keyboard ( ) | This method takes a string of keystroke characters, and updates the screen buffer as if someone typed the characters on a keyboard. The function doesn't support attention keys. The method also accepts certain three character escape sequence keys.<br>Keyboard (Input String); |
| Home ( ) | This function positions the cursor at the 0,0 screen coordinates.<br>home ( ); |
| SetField ( ) | This function sets the screen field value. There are three values: FieldValue is a string that contains the field value; Row is the row coordinate of the field to set; and Column is the column coordinate of the field to set.<br>setField (FieldValue, Row, Column); |
| GetField ( ) | This function returns the screen's field value as a string. The function takes two values: first, Row is the row coordinate of the field to set; and second, Column is the column coordinate of the field to set.<br>FieldValue = GetField (Row, Column); |
| FindField ( ) | This function finds the first field on the screen containing a regular expression. There are three values: Expression is a string that contains the expression value; Row is the row coordinate of the found field; and Column is the column coordinate of the found field.<br>FindField (Expression, Row, Column); |
| &FM | Field Mark |
| &HO | Home |
| &Ln | Cursor Left n Times |
| &Nn | Newline n Times |
| &Rn | Cursor Right n Times |
| &Tn | Tab n Times |
| &Un | Cursor Up n Times |
| &Bn | Back Tab n Times |
| &Dn | Cursor Down n Times |
| &DL | Delete |
| &DU | Dup |
| &EF | Erase to End-of-field |

FIGS. 9 and 10 illustrate the configuration of GetSavings and GetBankcard EPI SS transactions, respectively, in parallel fashion to the configuration of the GetCustomer transaction illustrated and just described in relation to FIG. 8. Screen image 900 of FIG. 9, and screen image 1000 of FIG. 10, correspond to persistent data records 176 and 178 of FIG. 1, respectively.

FIG. 11 illustrates the configuration of a relational database management software system (RDBMS) used as a data source. The configuration of the RDBMS data source parallels the configuration of the EPI data source illustrated and described in relation to FIG. 7. The "Informix (RDBMS)" element 1191 of the visible contents 664 from the resource display area (660 of FIG. 6) of the DOM Configurator main screen (600 in FIG. 6) represents the configuration information for an RDBMS data source 130e. Dialog box 1100 comprises execution environment information area 1110, resource adapter management area 1120, and resource adapter-specific information area 1130.

Dialog box area 1110 displays information about the execution environment of the target data source. The types of information contained in display area 1110 are the same as for display area 710 described earlier in reference to FIG. 7. Dialog box area 1120 displays information principally used by the PAD software to manage any process executing a resource adapter using the instant configuration. The types of information contained in display area 1120 are the same as for display area 720 described earlier in reference to FIG. 7. Display area 1130 contains no information, as no additional information beyond that accommodated in display areas 1110 and 1120 is needed to manage the execution of an RDBMS-type resource adapter FIG. 12 illustrates the configuration of a session definition as may be required by RDBMS software. When display element 1191 for the Informix RDBMS data source is added to the resource display area at the specific request of the user, "Sessions" element 1192 is automatically available for display. "Sessions" element 1192 serves as the anchor point for a list of logical sessions the resource adapter may establish with the data source in order to interact with the data source. The user of the DOM Configurator specifically adds the "sys2_informix_session" display element 1291 to the sessions list anchored by element 1192. Each session element, such as 1291, represents configuration information for a logical connection to the RDBMS data source.

Dialog box 1200 displays the configuration information underlying session element 1291. The "Session Name" field indicates an identifier by which the instantly configured session may be known. The "Database Type" field indicates the name of a library file containing program code that can transform SS transaction requests and responses between a generalized RDBMS format and a format required by a particular RDBMS data source. The "Database Type" field is used because the design of this embodiment employs a generalized RDBMS resource adapter that is specialized to a particular RDBMS server by this association to a related library file. The "Server Name" field indicates the name by which the data source computer can be contacted by software components attached to a common communication system. The "Database Name" field indicates the name by which the RDBMS server identifies the particular database containing the data items targeted for access. The "Database Role" field indicates the function of connection; e.g., whether the connection is used to connect a client for data access requests, or whether the connection is used for performing data base administration activities. The "User ID" and "Password" fields indicate security parameters that will authenticate and authorize the resource adapter to utilize the services of the RDBMS data source. The "# of Connections" field indicates the number of logical connections the resource adapter should establish between itself and the data source using the instant configuration information. The "# of Output Rows" field indicates the default maximum number of table rows that should be included in the response to an SS transaction request originating from the resource adapter.

Notably, no sessions list is included in the configuration information for a CICS-EPI data source already described in relation to FIG. 7. This is because different data sources impose different interface requirements. In a preferred embodiment, the construction of the DOM configurator software is similar to that of the DOM server software wherein the resource adapters interface to the DOM core in a common fashion to provide a degree of modularity. In a preferred embodiment, resource adapter configuration maintenance code, including the program code to effectuate the dialog boxes related to the particular resource adapter, are modular in design and interface to "core" GUI-based DOM Configurator code using a common interface. Such a construction improves the upgradability of the DOM Configurator as new types of data sources become desired.

FIG. 13 illustrates the configuration of an SS transaction between a DOM server and an RDBMS data source. In concept, this parallels the configuration of an SS transaction between a DOM server and a CICS-EPI data source—the transaction configuration contains all of the information necessary to conduct a transaction. In detail, however, the configuration information and its organization differ for an RDBMS transaction.

When display element 1191 for the Informix RDBMS data source is added to the resource display area at the specific request of the user, "Transactions" element 1193 is automatically available for display. "Transactions" element 1193 serves as the anchor point for a list of server-source (SS) transactions that the Informix RDBMS resource adapter can process. The user of the DOM Configurator specifically adds the "GetSecurity" display element 1391 to the transactions list anchored by graphical element 1193. When GetSecurity 1391 is added to the transactions list, "Parameters" 1392, "Field Map" 1393, and "SQL" 1395 elements are automatically anchored off of GetSecurity element 1391. Parameter 1392 and SQL 1393 configuration elements each directly possess underlying configuration information. Field map element 1393 serves as the anchor point for a list. Each entry in the field map list establishes the correspondence between a data item in a DOM data container object and a data item accessed using the RDBMS.

Dialog box 1310 illustrates the configuration information immediately represented by GetSecurity element 1391. A "Name" field indicates a transaction name by which the CS transaction is known within the configuration database. The transaction name must be unique within the resource adapter configuration to which it belongs.

Dialog box 1320 illustrates the configuration information represented by "Parameters" element 1392. A "Type" field indicates whether the database processing for the transaction is defined by structured query language (SQL) statements supplied to the data source by the resource adapter or by a predefined procedure stored on the data source computer. If a predefined procedure is to be used, the name of the procedure must be indicated in the "Proc Name" field. If SQL statements are to be supplied to the data source by the resource adapter, the SQL statements are specified using dialog box 1340. SQL statements specified using dialog box 1340 may include substitution variables such as the "$id" variable shown in dialog box 1340. SQL and variable substitution techniques are well known and understood in the art. A "Session Name" field in dialog box 1320 indicates the name of database session to utilize in conducting the transaction. Such a session must have already been configured in accordance with the discussion regarding FIG. 12. A "# of Output Rows" field indicates the maximum number of table rows that should be included in the response to the instant SS transaction request. This number overrides the default specified in the session configuration as discussed previously in reference to FIG. 12.

Dialog box 1330 illustrates the configuration information represented by "password" element 1394. Password element 1394 belongs to the field map list. Field map list items direct the automatic transfer of data items between data container objects in the DOM server and data fields managed by the RDBMS data source. The user of the DOM Configurator specifically adds the "password" display element 1394 to the field map list anchored by field map element 1393. An "Attribute Name" field indicates the name of a particular data item stored in a data container object within the DOM server. The data container determines the direction of the data item transfer. If the relevant data container object relates to a request message from a client to the DOM server, the data item moves from the data container object to the data source field before the SS transaction request is sent to the data source. If the relevant data container object relates to a response message to be sent from the DOM server to the client, the data item moves from the data source field to the data container object after the SS transaction response is received from the data source. The same attribute name may be configured into both the request-related and response-related data containers configured for a CS transaction. Configuration of request and response data containers is discussed later in reference to FIG. 14. A "Field Name" field in dialog box 1330 indicates the name used by the RDMBS data source to identify a particular data item field.

In this example, the "Field Name" of "Pass Phrase" is used to identify a data item from the second column of relational table 1300. Row 1301 of relational table 1300, corresponds to persistent data record 174 of FIG. 1. In this example, the data item in the "Pass Phrase" column comes from Row 1301 of relational table 1300.

Method (CS Transaction) Configuration

After resources have been configured (i.e., SS Transactions), methods that use them can be configured (i.e., CS transactions). The configuration activity represented by FIGS. 14 and 15 correspond to the activity represented by step 540 of FIG. 5.

Figure 14:
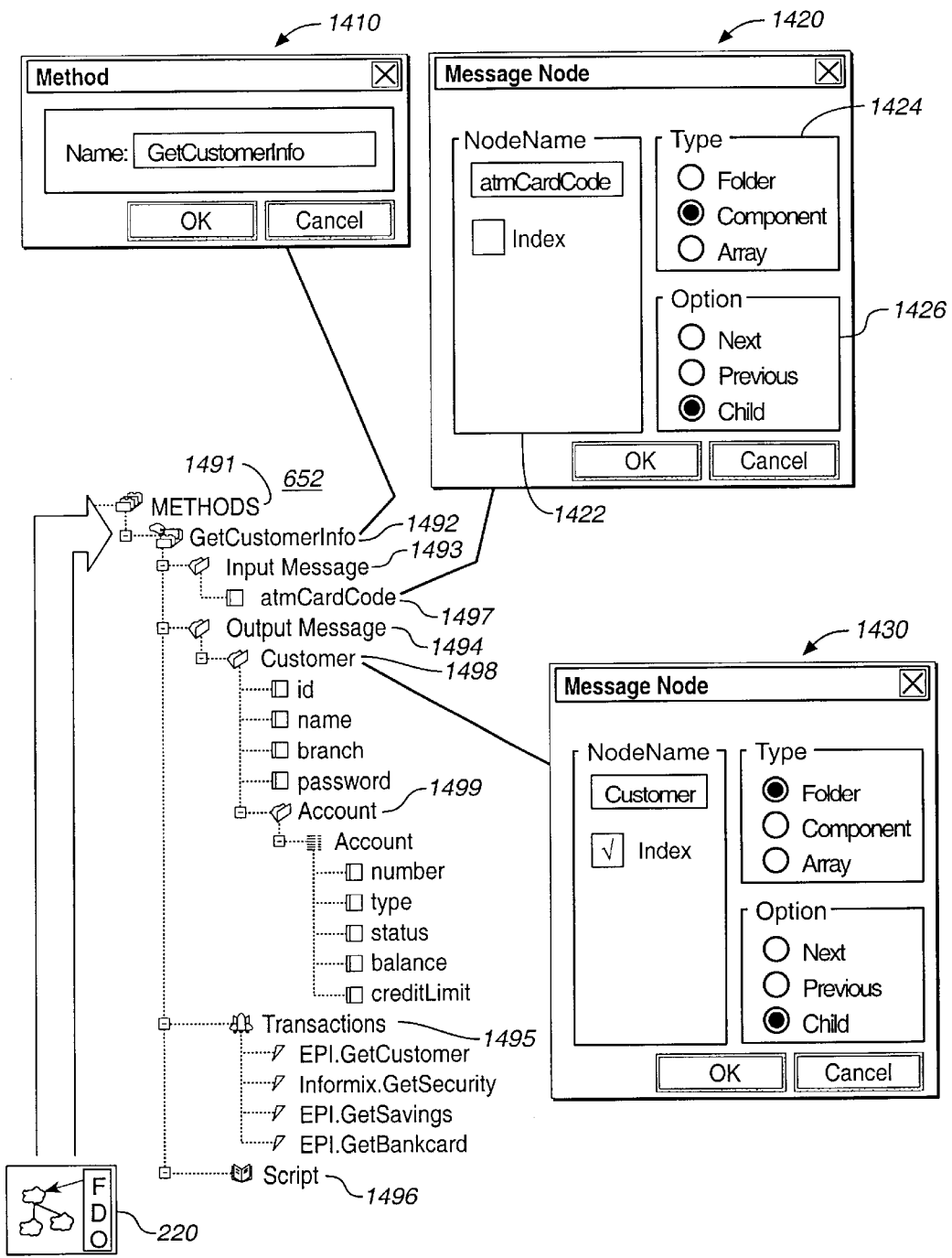
FIGS. 14 through 15 illustrate the configuration of a CS transaction between a client application program and a DOM server.
Figure 15:
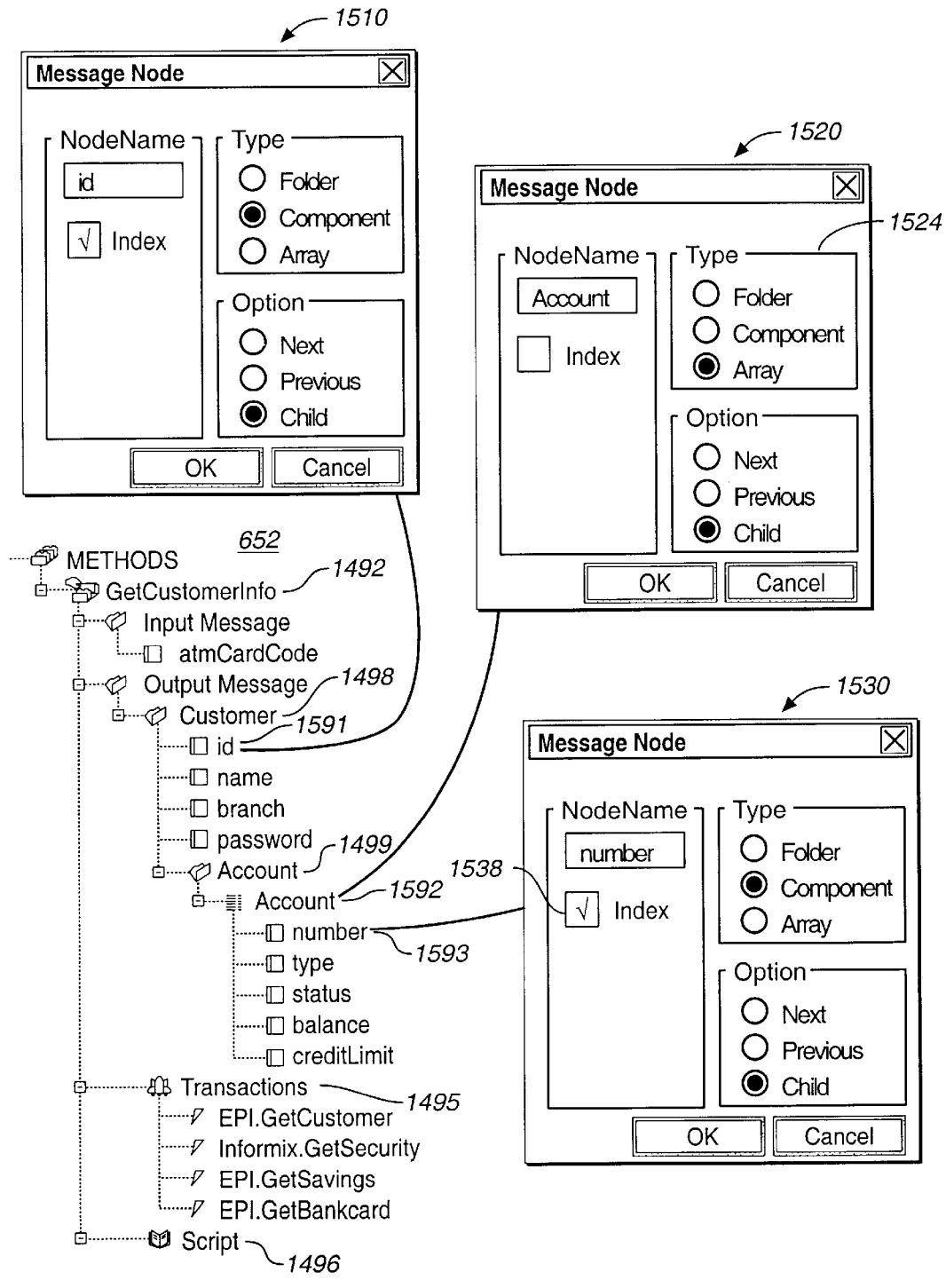

FIGS. 14 through 15 illustrate the configuration of a CS transaction between a client application program and a DOM server. Referring first to FIG. 14, the "GetCustomerInfo" element 1492 of the visible contents 652 from the method display area (650 of FIG. 6) of the DOM Configurator main screen (600 in FIG. 6) represents the configuration information for a CS transaction that may be requested by application program 220. After adding element 1492 to the method display area, the user of the DOM Configurator may display a dialog box 1410 to view and modify the configuration information represented by the element 1492. A "Name" field in dialog box 1410 indicates a name to uniquely identify the transaction among those in the list anchored by graphical element 1491. This name will be used by application program 220 to request the transaction from the DOM server.

When element 1492 for the GetCustomerInfo CS transaction is added to the methods display area at the specific request of the user, "Input Message" element 1493, "Output Message" graphical element 1494, "Transactions" graphical element 1495, and "Script" graphical element 1496 are automatically available for display. "Input Message" 1493 and "Output Message" 1494 elements represent the request and response messages, respectively, exchanged between the client and the DOM server. "Transactions" 1495 and "Script" 1496 elements represent the processing performed by the DOM server to satisfy the client's request. In the presently described embodiment, either the Transactions 1495 element or the Script 1496 element will determine the processing for the transaction, and only one of the two may be further configured. "Input Message" 1493 and "Output Message" 1494 elements each serve as the anchor for a potentially multi-level, hierarchical list of message node elements. The hierarchical arrangement of the message node lists reflects the hierarchical arrangement of data container objects that DOM server software constructs at run-time to embody the input and output messages, as well as the hierarchical arrangement of programming objects in application program 220.

The user of the DOM Configurator specifically adds the "atmCardCode" message node element 1497 to the Input Message list anchored by element 1493. The atmCardCode element represents the sole data item passed from a client to the DOM server when requesting a GetCustomerInfo transaction. The atmCardCode data item is then used as a search argument by the DOM server when preparing a request for SS transaction GetCustomer to fulfill the client's GetCustomerInfo request (discussed in reference to FIG. 8). Dialog box 1420 illustrates the configuration information immediately represented by atmCardCode element 1497. A "Name" field indicates a name to uniquely identify the node within parent message element 1493. The "Type" field indicates the role of the message node within the hierarchical list. A component-type message node corresponds to a data item to be transferred between the client application program and the DOM server. The "Option" field is used when dialog box 1420 is used to insert a new message node. The "Option" field indicates the position in the hierarchical list for the node to occupy, relative to the most recently selected element. Here, the most recently selected element is 1493. "Next" and "Previous" indicate that the new node should occupy the subsequent or preceding position, respectively, at the same level in the hierarchy. "Child" indicates that the new node should occupy a related position, one level lower in the hierarchy. The "Index" field is described later in relation to message mode 1593. The "Index" field is meaningful only for component-type message nodes.

While the input message configured under anchor element 1493 contains only one element 1497, the output message for the GetCustomerInfo CS transaction configured under element 1494 contains multiple elements arranged in a two-level hierarchy. The hierarchy corresponds to the programming object hierarchy illustrated in FIG. 1. The upper level of the object hierarchy includes an object 160 to represent a banking customer. The lower level of the object hierarchy includes multiple objects 162–164, each of which represents a particular account owned by the banking customer. In the output message configuration depicted in FIG. 14, the upper level of the hierarchy begins at Customer element 1498, and the lower level of the hierarchy begins at Account element 1499.

The user of the DOM Configurator specifically adds the "Customer" message node element 1498 to the Output Message list anchored by element 1494. Dialog box 1430 illustrates the configuration information immediately represented by Customer element 1498. The fields and their meanings are the same for all message nodes as described above in relation to dialog box 1420. The "Type" field in dialog box 1430, however, indicates the role of this message node to be of type "Folder." A folder-type message node indicates within a message that the object in the application program 220 that embodies data items represented by immediately subordinate nodes, is instantiated from a class type that is dynamically determined at run-time. The customer folder node represents the finite family of class types from which the object may be instantiated. Notably, the customer folder "represents" the family of class types without having any awareness of what the members of the family are. That information is created by the application programmer and is ensconced within the application program 220 itself. The list of component message nodes immediately subordinate to the folder node represents the set of all field types that can potentially be exchanged during the servicing of a particular instance of a GetCustomerInfo transaction. The list of field types actually exchanged for a particular instance of the GetCustomerInfo transaction will correspond to the class-type family member used to instantiate the related programming object in the client application program 220.

In reference to FIG. 15, the user of the DOM Configurator specifically adds the immediately subordinate "id" message node element 1591 to the Customer folder node 1498. Dialog box 1510 illustrates the configuration information represented by "id" element 1591. The "name," "branch," and "password" elements exist under the Customer folder node in like fashion.

The user of the DOM Configurator specifically adds the Account folder node 1499 under Customer folder node 1498. The configuration information represented by Account folder graphical element 1499 parallels that for Customer folder node 1498 as displayed by dialog box 1430 (see FIG. 14), with the obvious change to the contents of the "Node Name" field.

The user of the DOM Configurator specifically adds the Account array message node 1592 under Account folder node 1499. The configuration information represented by Account array element 1592 is displayed by dialog box 1520. The noteworthy difference between the configuration information for the account array message node 1592, and the configuration information for the message nodes previously described, is the selection of "Array" for the contents of "Type" field 1524. An array-type message node indicates within a message that multiple occurrences of the set of message nodes subordinate to the array-type message node may be contained within a single message occurrence. In the presently described example, account array node 1592 provides for the GetCustomerInfo response message to contain data regarding multiple accounts.

The user of the DOM Configurator specifically adds the "number" message node 1593 under Account array node 1592. The configuration information represented by "number" element 1593 is displayed by dialog box 1530. The noteworthy difference between the configuration information for the "number" component-type message node 1593, and the configuration information for the component-type message nodes previously described, is the affirmative entry for the contents of "Index" field 1538. The affirmative entry for the contents of "Index" field 1538 indicates that the data item represented by the "number" component node can serve to uniquely identify one set of account array subordinate nodes from among the multiple sets that may exist by virtue of array node 1592. Component-type nodes "type," "status," "balance," and "creditLimit" are configured as other component-type nodes. If any of these nodes is also configured with an affirmative indication in its "Index" field, then it is combined with the "number" node to form the unique identifier for the set of array subordinate nodes.

"Transactions" 1495 and "Script" 1496 elements represent the processing performed by the DOM server to satisfy the client's request. As mentioned earlier, in the presently described embodiment, either the Transactions 1495 element or the Script 1496 element will determine the processing for the transaction, and only one of the two may be further configured. In the present example, Transactions element 1495 is further configured to represent the data source processing for the GetCustomerInfo CS transaction. Transactions element 1495 serves as an anchor for an ordered list of SS transactions. In the present example, the "EPI.GetCustomer," "Informix.GetSecurity," "EPI.GetSavings," and "EPI.GetBankcard" elements were actively placed under Transactions element 1495 by the user of the DOM Configurator. This action may have been performed in a preferred embodiment by using a drag-and-drop user interface technique, well known in the art, to "copy" an SS transaction element, such as GetCustomer, from the resource display area (660 of FIG. 6) to Transactions element 1495. When copied, the SS transaction is identified by the concatenation of the resource element name under which the SS transaction element is configured, a period ("."), and the SS transaction element name. When the DOM Server performs a CS transaction using a Transactions list, the SS transactions are performed sequentially, in the order they appear in the list. Other embodiments may permit non-sequential, and/or out-of-order processing of the transactions in the list by providing automatic or user-specified mechanisms to mandate ordered processing between transactions having an interdependency. An example of such an interdependency is hypothetical transaction B, the request message for which includes data originating from hypothetical transaction A.

Alternatively, DOM server processing for a CS transaction can be directed by the configuration information of a "Script" graphical element such as element 1496. In this case, a dialog box like the dialog box used to maintain SQL statements (1340 of FIG. 13) or the dialog box used to maintain CICS-EPI scripts (820 of FIG. 8) is used to maintain the script configuration information represented by Script element 1496. In a preferred embodiment the scripting language is DOM-specific, but modeled closely after a widely known programming language such as C. The scripting language may include support for a variety of data types, variable manipulation, arithmetic and logical operators, program flow control statements and structures, string-related functions, and specialty functions useful in navigating and manipulating hierarchical lists and object structures. Elements of an exemplary scripting language appear in Table 2. The scripting language of a preferred embodiment also provides the capability to execute configured SS transactions. Such a scripting language extends the capability of the DOM server to provide advanced functionality, e.g., as conditional error handling or user-implemented commit and rollback processing across disparate data sources. The extended capability provided by the scripting language represents a further advantage of the present invention.

TABLE 2

General Scripting Language Elements

| Element | Description |
| --- | --- |
| Data Types | |
| long, double, string, boolean | enjoy sstandard usage as in other computer languages like C |
| pointer | to introduce hidden variables, i.e., variables that belong to another context, e.g., a different CS transaction processing request. |
| identifier | represents a name of a variable. A ' character (i.e., on the apostrophe key) represents an identifier in an argument. |
| user-defined | The user-defined type allows you to manipulate user-defined objects within a script. User-defined data types use qualified names having a dot notation (e.g, parent.child). |
| Variable Manipulation | |
| = | assignment operator |
| Operators | |
| + − * / − | addition, subtraction, multiplication, division, unary; standard arithmetic |
| && \|\| ! | AND, OR, NOT; standard logic |
| < > <= >= != | less than, greater than, less or equal, greater or equal, not equal; standard comparison |

TABLE 2-continued

General Scripting Language Elements

| Element | Description |
| --- | --- |
| Program Flow | |
| if . . . then | conditional branch |
| while . . . endloop | top-checking loop |
| do . . . until | bottom-checking loop |
| continue, break, goto, exit | standard use |
| String Functions | |
| string( ) | converts any native type variable (e.g., long, double, etc.) to a string. |
| substring( ) | creates a substring from another string. format: substring(source, start, length) |
| index( ) | searches for the first occurrence of a substring within a string. |
| length( ) | returns the length of the specified string. |
| Hierarchy Functions | |
| child_count( ) | returns the number of children for the element |
| child( ) | returns a tree that corresponds to one of the tree's child nodes or a NULL tree if the node doesn't exist; otherwise, it returns a native-value defined by a leaf type. |
| clone( ) | creates a cloned copy of the FDO tree or its subtree specified by the path. |
| connect( ) | connects an FDOTree to a user-object identifier or a passed-in argument in the specified path. This function behaves like the assignment operator with user-objects; |
| name( ) | returns an element name (a string) corresponding to the tree-element residing under the specified path. |
| disconnect( ) | disconnects a node from the specified path. |
| destroy( ) | destroys a subtree specified by an identifier and path. |
| element_type( ) | this function returns a code corresponding to its type, i.e., non-existent, long, double, string, or node. |
| make_node( ) | creates an empty node specified by the identifier and an optional path. |
| Miscellaneous | |
| print | print the value of variables to an output file or device |
| exist( ) | returns true if a variable with the specified name exists in the context space; otherwise, it returns false. |
| execute( ) | performs the named SS transaction |

Figure 16:
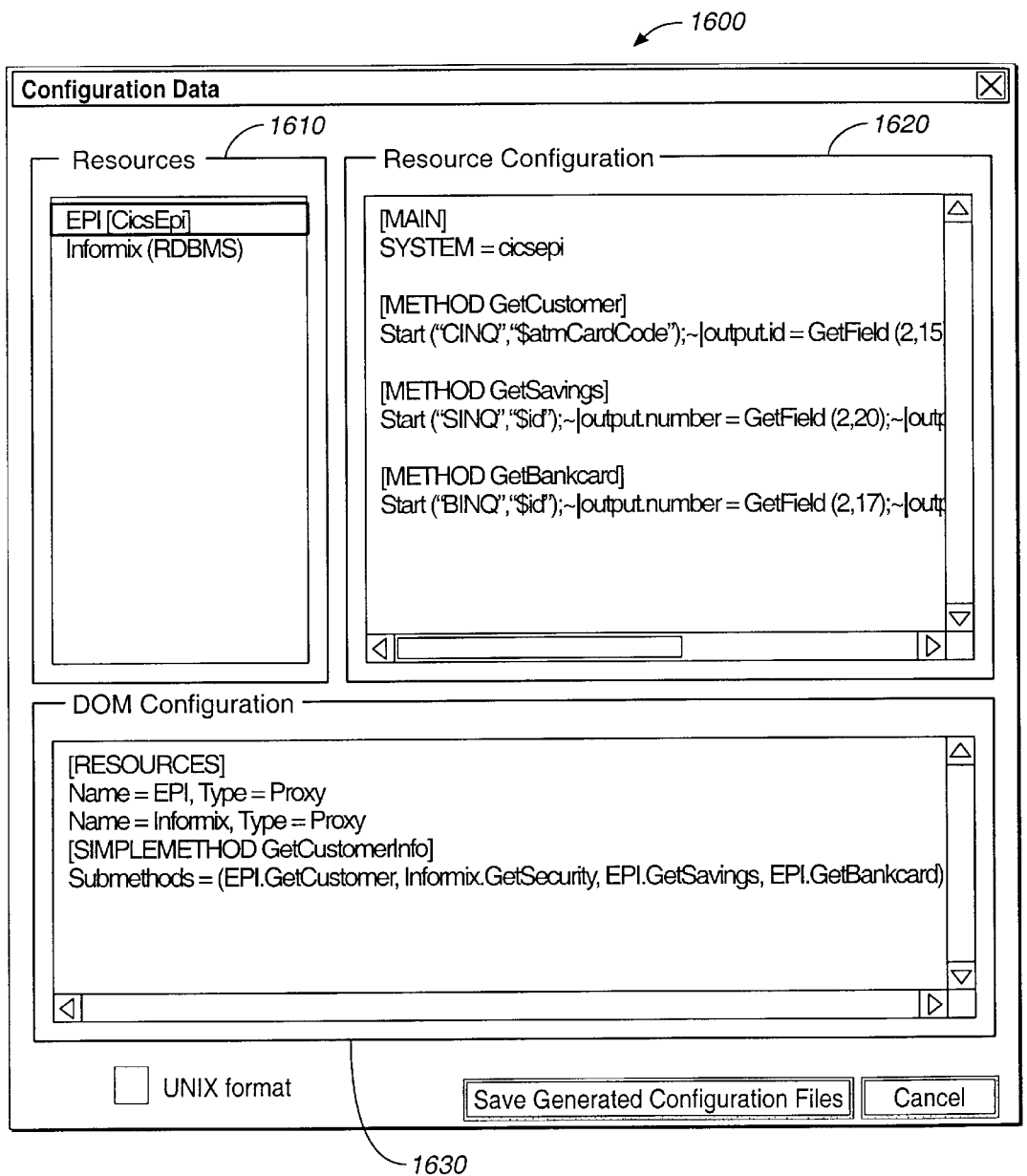
FIG. 16 illustrates a screen display for viewing configuration data in test format.

FIG. 16 illustrates a screen display for viewing configuration data in text format. The GUI-based Configurator provides the screen display depicted by window 1600 as an aid in troubleshooting and understanding. Window 1600 comprises "Resources" area 1610, "Resource Configuration" area 1620, and "DOM Configuration" area 1630. Resources area 1610 displays a list of the names of configured resources, i.e., data sources. The presently selected resource name appears as light text against a dark background. "Resource Configuration" area 1620 displays the configuration for the presently selected resource of area 1610 in text format. In the sample text depicted in display area 1620, "Method" refers to "SS transaction." The contents of display area 1620 corresponds to the contents of a Resource Adapter configuration file 576 as depicted in FIG. 5.

"DOM Configuration" area 1630 displays configuration information in text format. In the sample text depicted in display area 1630, "Simplemethod" refers to a CS transaction, and "Submethod" refers to an SS transaction. The contents of display area 1630 corresponds to the contents of a DOM configuration file 574 as depicted in FIG. 5.

It is noted that other GUI-configurator screen displays similar to those depicted in FIGS. 6 through 16 may be implemented to provide viewing and/or editing of any information in the configuration database. For example, GUI-configurator screens maybe be implemented for the PAD configure. One skilled in the art recognizes that various screen formats and organizations may be used without departing. After the implementation process depicted and described in relation to FIG. 5 is complete, execution of an embodiment employing the present invention can begin.

The Execution Process

Figure 17:
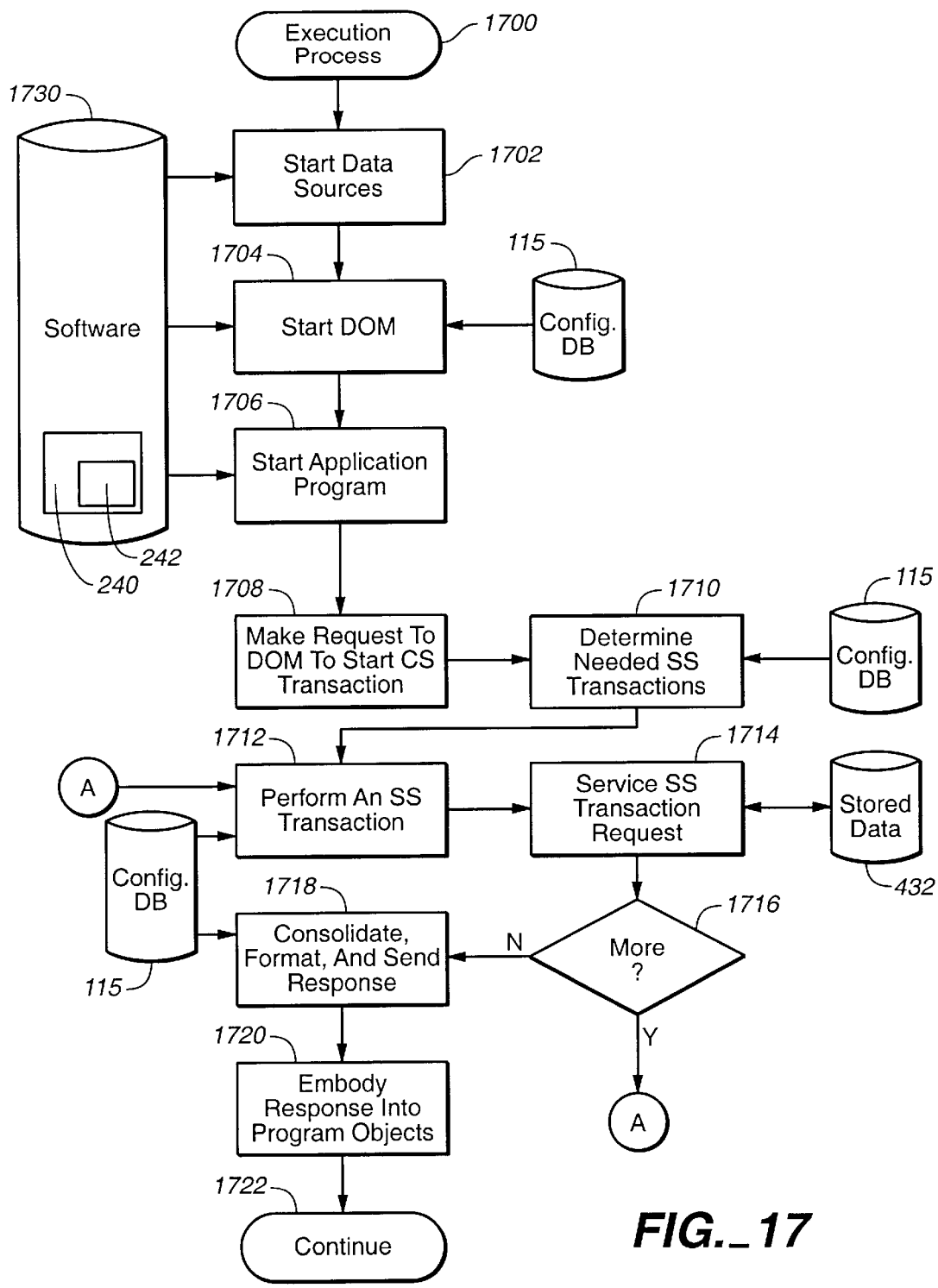
FIG. 17 is a flowchart showing the execution process for one system employing the present invention.

FIG. 17 is a flowchart showing the execution process for one system. Step 1702 initializes the data sources. Data sources may run on one or more host computers. For each data source, the software program code for the data source is loaded into computer memory from mass storage media 1730, such as a hard disk. The loading operation is performed by the operating system on the data source host computer. Once loaded into memory, the operating system passes control of the computer to the program code of the data source software. The program code then prepares the data source host computer to receive and process SS transaction requests.

Step 1704 initializes the DOM server. The DOM server may run on a host computer shared with one or more data sources, or it may run on a separate machine. The software program code for the DOM server is loaded into computer memory from mass storage media 1730, such as a hard disk. The loading operation is performed by the operating system on the DOM server host computer. Once loaded into memory, the operating system passes control of the computer to the program code of the DOM server software. The program code then prepares the DOM server host computer to receive and process CS transaction requests. The DOM server software uses information from the configuration database 115 to direct the initialization process. As part of initialization, The DOM server software may establish communication with one or more data sources started in step 1702 in anticipation of sending SS transaction requests to the data sources in order to process the CS transaction requests the DOM server software receives.

Step 1706 initializes the user application program. The user application program may run on a computer shared with one or more data sources, on a computer shared with the DOM server, or it may run on a separate machine. The software program code for the application program 242 is loaded into computer memory from mass storage media 1730, such as a hard disk. The loading operation is performed by the operating system on the application program host computer. Once loaded into memory, the operating system passes control of the computer to the program code of the application program. The program code then performs the data processing operations desired by the user. In the course of these data processing operations the client application program makes a CS transaction request.

The running application program makes a request to the DOM server in step 1708 to perform a CS transaction. In making the request, the application program communicates information to the DOM server. Such information may include, for example, the type of CS transaction to perform and identifiers for the specific data items to be accessed.

In step 1710, the DOM server determines the SS transactions needed to fulfill the request made by the application program in step 1708. The DOM server identifies the transactions using information loaded from configuration database 115. The identities of the SS transactions come from either the transactions list or the script configured for the method (the CS transaction) as recorded in the configuration database 115 and discussed earlier in reference to FIG. 15.

In step 1712, the DOM server requests performance of an SS transaction identified in step 1710, using information loaded from configuration data base 115. In making the SS transaction request, the DOM server communicates relevant information to the appropriate data source. Such information may include, for example, the type of SS transaction to perform and identifiers for the specific data items to be accessed. Some of the information communicated to the data source by the DOM server, may have originally been communicated to the DOM server by the client application program. For example, the application program may communicate a customer number to the DOM server, which in turn communicates the customer number to the data source. The data source, in turn, accesses specific data items contained among its stored data 432 that are associated with that customer number.

In step 1714, a data source receives the SS transaction request communicated by the DOM server in step 1712. The data source processes the request, accessing relevant data items contained among stored data 432. The data source concludes the SS transaction by indicating the results of the processing in a response information message that is communicated to the DOM server.

After receiving the response information communicated from the data source in step 1714, the DOM server determines whether any SS transactions identified in step 1710 have yet to be performed. If transactions remain, the DOM server returns to step 1712 to process the next SS transaction. If the needed SS transactions are completed, the DOM server resumes operation with step 1718.

In step 1718, the DOM server completes the processing for the CS transaction using information loaded from configuration database 115. The DOM server determines the format of the response message based on the type of CS transaction. The DOM server then constructs a response message in the required format, using data items received and consolidated from possibly multiple SS transactions. The constructed response message is then communicated to the client application program.

In step 1720, the application program receives the formatted response to its CS transaction request, as communicated by the DOM server in step 1718. Data items represented in the response message are extracted from the message. Program code in the application program embodies the extracted data items into programming objects. The programming objects are interrelated into a topology which is, itself, also represented in the response message. After the programming objects embody the data items from the response message, the application program continues execution in step 1722. Downstream instructions in the application program may then utilize the programming objects of step 1720 to usefully employ the data items the objects embody. In accordance with the present invention, the programming object data items reflect persistent copies of corresponding data items contained in stored data 432 and maintained by the data access software.

Figure 18:
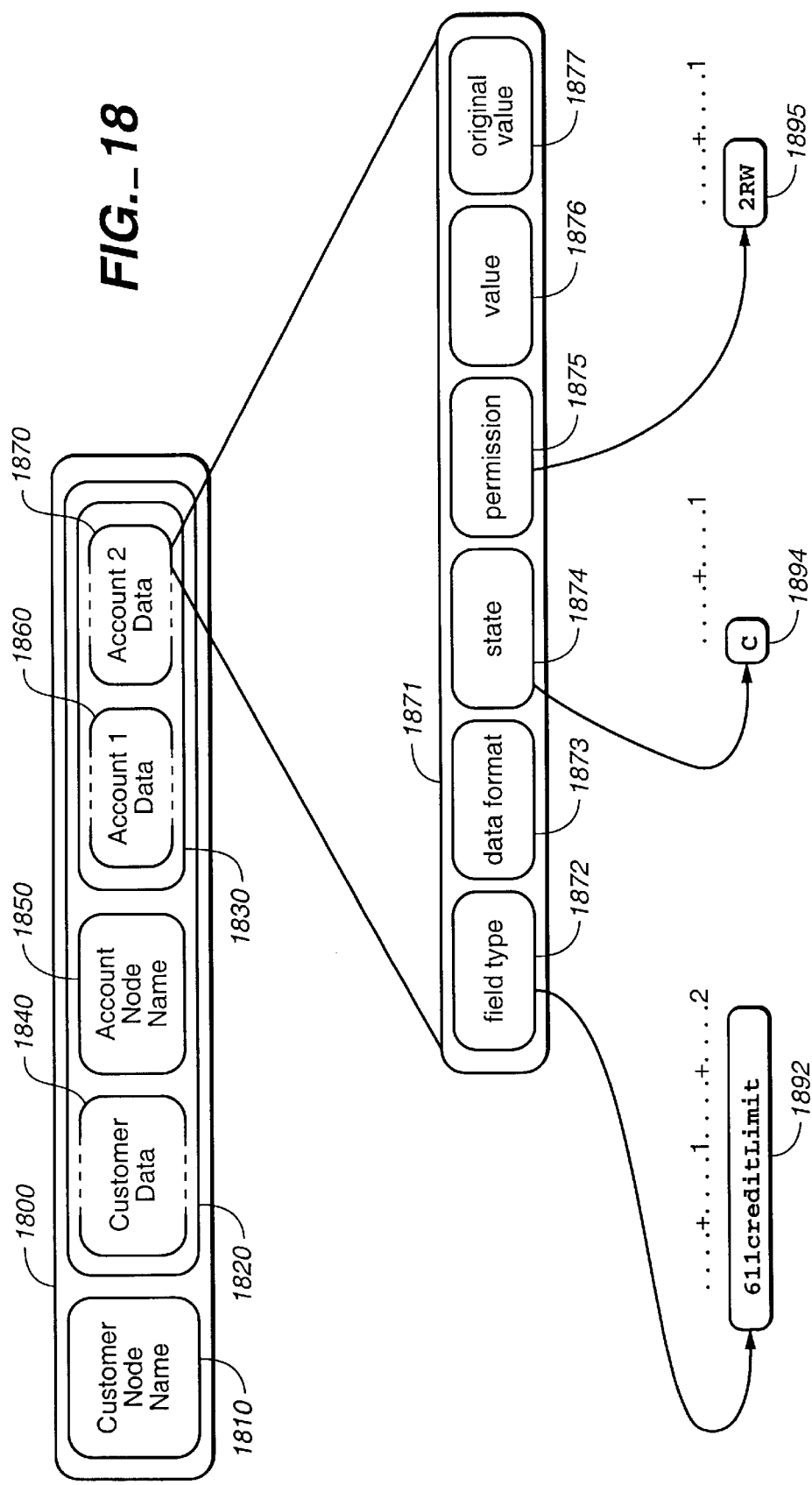
FIG. 18 depicts the layout of a data stream for communication between client and server.

FIG. 18 depicts one construction of a data stream for communication between a client application program and a DOM server during the execution process discussed in reference to FIG. 17. The data stream of FIG. 18 is constructed of tokens. Each token comprises a token length indicator followed immediately by token data. Token instances 1892, 1894, and 1895 depict examples of each of the three possible token coding formats. The difference between the format lies in the coding of the length indicator portion of the token. The first character of the token determines the coding format of a particular token. The meanings ascribed the first token character appear in

TABLE 3

Token Formats

| Format Group | First Character | Subsequent Characters (Bytes) |
| --- | --- | --- |
| I | 0 | none: empty value |
|  | 1 | the token data is contained in 1 byte |
|  | 2 | the token data is contained in 2 bytes |
|  | 3 | the token data is contained in 3 bytes |
|  | 4 | the token data is contained in 4 bytes |
| II | 5 | the length of the value is represented in the next 1 byte and token data immediately follows |
|  | 6 | the length of the value is represented in the next 2 bytes and token data immediately follows |
|  | 7 | the length of the value is represented in the next 3 bytes and token data immediately follows |
|  | 8 | the length of the value is represented in the next 4 bytes and token data immediately follows |
|  | 9 | the length of the value is represented in the next 5 bytes and token data immediately follows |
| III | Any Other | none: the length of the token data is implicitly 1 byte and the first character is the token data |

For format group I tokens, the first character may be 0 through 4 and represents the number of bytes of token data to immediately follow. A first character of '0' indicates that zero bytes follow and thus may be used to represent an empty value. Token instance 1895 depicts an example of a format group I token. The first character is a '2' indicating that two bytes of token data follow, those being the characters "RW." For format group II tokens, the first character may be 5 through 9 and represents a number of characters to follow that, themselves, contain a representation for the number of bytes of token data to follow immediately thereafter. Token instance 1892 depicts an example of a format group II token. The first character is a '6' indicating that two bytes representing the length of token data follow. The next two characters are "11" indicating that eleven bytes of token data follow, those being the characters "creditLimit." For format group III tokens, the first character of the token is not the length of data, but rather is the data itself, having an implied length of one byte. Token instance 1894 depicts an example of a format group III token. The first character is a 'C' indicating that the character 'C' is the token data with an implied length of one byte.

Five different types of tokens may be used to construct a data stream. The various types of tokens differ according to their content. Some token types may be used to aggregate multiple tokens into a single token, thus encapsulating the multiple tokens. Such nesting by the tokenization process, producing tokens within other tokens, is advantageously employed to represent information in the data stream about the hierarchical topology that relates data items conveyed in the data stream. The hierarchical topology information logically segregates and distinguishes data items belonging to different levels of the hierarchy as well as those belonging to the same level. For example, a parent is segregated from its children at a lower level, and each child is segregated from the others on the same level.

The first type of token is the data stream token 1800 that contains the entire data stream. The data stream may correspond to either a request or a response message for exchange between a client and a DOM server. Data stream tokens correspond to the aggregation of all message nodes subordinated to an input message or output message element for a CS transaction (Method) configuration as discussed in relation to FIGS. 14 and 15.

The second type of token is the family token 1810 that occurs at the head of a branch in the topology of the hierarchy and specifies the object-type family to incorporate immediately following data items. Token 1850 is also a family-type token. Family tokens correspond to folder-type message nodes in the input or output message configuration for a CS transaction (Method) as discussed in relation to FIGS. 14 and 15, and may contain the name of the folder-type message node as the specifier for the object-type family.

The third type of token is the branch token 1820 that immediately follows a family token. A branch token contains all of the token information that logically depends from the preceding family token. Token 1850 is also a branch-type token. Branch tokens correspond to the aggregation of all message nodes subordinated to a folder-type message node in an input or output message configuration for CS transaction (Method) as discussed in relation to FIGS. 14 and 15.

The fourth type of token is the business object token 1840. A business object token corresponds to an instance of an object having an object-type, i.e., class, belonging to the family represented by its immediately preceding family token. Tokens 1860 and 1870 are also business object tokens. The business object token aggregates data items to be embodied by an object instance. A business object token further corresponds to some subset or the full set of component-type message nodes directly subordinated to the same message node in an input or output message configuration for a CS transaction (Method) as discussed in relation to FIGS. 14 and 15. For example, a business object token populated by the DOM core using data obtained from a GetSavings SS transaction will aggregate tokens corresponding to number, type, status, and balance component message nodes directly subordinated to Account array node 1592 of FIG. 15. It will not include a token corresponding to the creditLimit component message node similarly subordinated. This is because the CICS-EPI SINQ display screen (900 of FIG. 9) underlying the GetSavings CS transaction does not provide a creditLimit data item.

The fifth type of token is the leaf token 1871. A leaf token corresponds to one particular component-type message node in an input or output message configuration for a CS transaction (Method) as discussed in relation to FIGS. 14 and 15. Token 1871 is the only leaf token depicted in FIG. 18, although a multiplicity of such embedded tokens are implied by the dashed-line portions depicting business object tokens 1840, 1860, and 1870. Token 1871 comprises tokens 1871–1877. The "data item" itself is contained by token 1876, the "value" token. The remaining tokens contained by leaf token 1871 contain information about the data item, i.e., they contain metadata. "Field type" token 1872 specifies the role of the data item. For example, the data item may be the number "4445678" but the field type contents will instruct whether that is a phone number or an account number. "Data format" token 1873 specifies the storage and representation format of the data item, e.g., integer, floating point, or character string. "State" token 1874 specifies the state of the data item relative to the persistent storage copy to which it corresponds. For example, a state of "C" for "clean" indicates that the data item has not been changed. "Permission" token 1875 specifies the degree of control the client application may exercise over the persistent storage copy corresponding to the data item. For example, a permission of "RW" indicates that the client application program is registered via access control mechanisms to access the persistent storage copy for both read and write operations. The access control mechanisms may be implemented in one or more architectural layers occurring between the application program and the stored data, e.g., the data access layer. "Original value" token 1877 reflects the data item as it resided on persistent storage when first retrieved, i.e., its unchanged state.

Inclusion of metadata along with a data item facilitates data stream to object transformation, and permits sophisticated functionality to be included in the CS transaction processing performed by the DOM server. For example, a Method script on the DOM server could utilize the state, value, and original value data to implement commit/rollback processing for a CS transaction defined across multiple data sources. Using the same information, the commit/rollback script could minimize the SS update transactions performed to those that maintain data items that were actually changed by the application program. Inclusion of metadata along with a data item exchanged between a client and the DOM server represents a further advantage of the present invention. Inclusion of a scripting language facility in the DOM server that permits a user to configure the processing for a CS transaction using a procedural language, and that permits conditional processing based on data items and related metadata, represent further advantages of the present invention.

Figure 19:
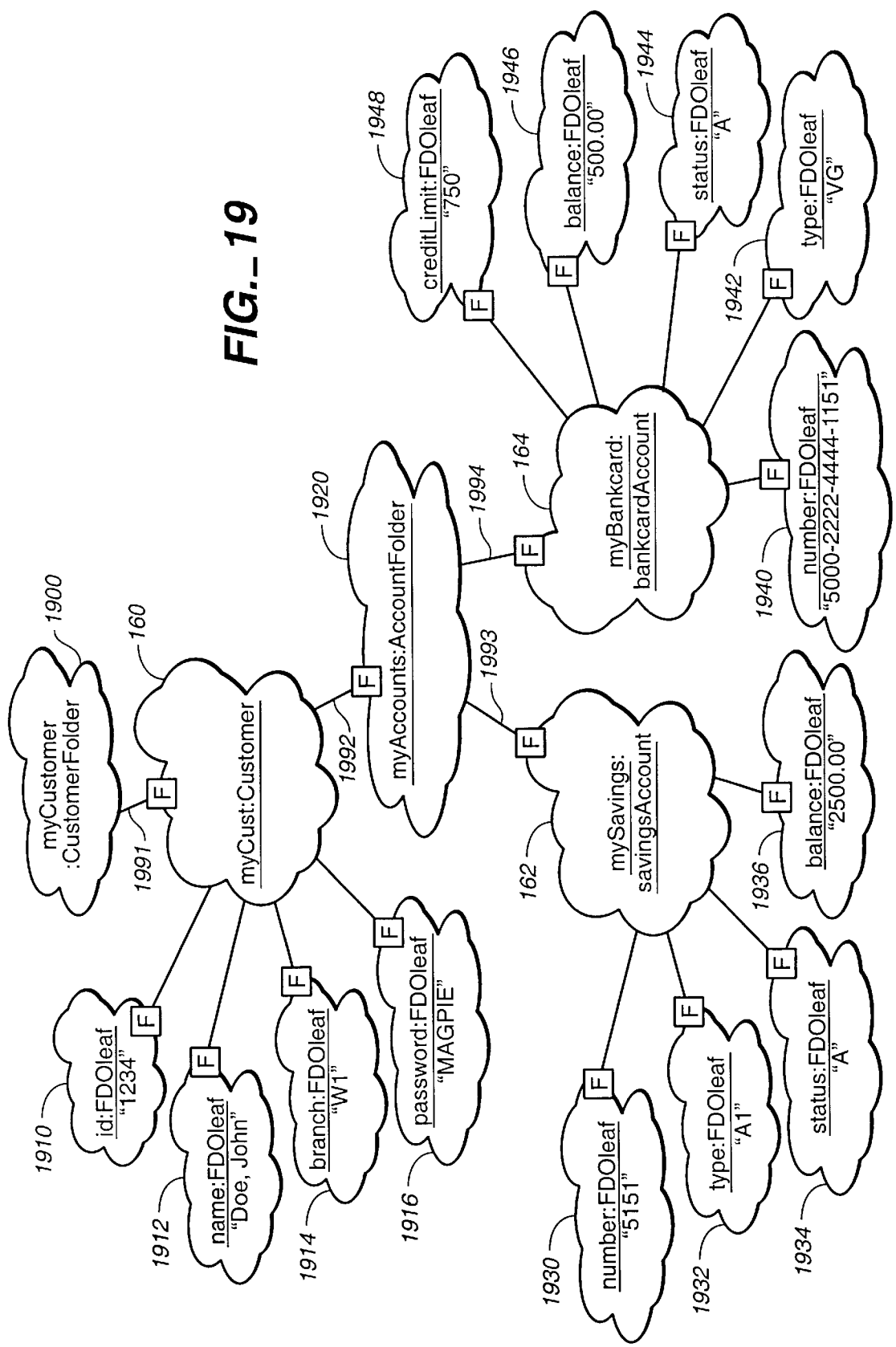
FIG. 19 is an object diagram of example programming objects used to relate and embody data items in a client application program.

FIG. 19 is an object diagram of example programming objects used to relate and embody data items in a client application program. The objects depicted are instantiated in the client application program during the execution process, for example, in step 1720 of FIG. 17. Objects 160, 162, and 164 of FIG. 19 correspond to like numbered objects depicted in FIG. 1. These objects are primary application programming objects. Primary application programming objects may be used by an application programmer to each represent a real-world physical or conceptual business object about which related data is maintained by the data sources. In the example shown, the primary objects 160, 162, and 164 represent a banking customer and the customer's savings and bankcard accounts, respectively.

Objects 1910–1916, 1930–1936, and 1940–1948 have a correspondence to the transient data items shown within programming objects 160, 162, and 164 in FIG. 1 and discussed earlier in reference thereto. These objects are utility programming objects that support the work of primary application programming objects in representing a business object. Each of these objects belongs to a primary object and stores a particular data item and its metadata. Each object also provides an interface to the data item for other portions of the client application program. The interface further supports the exchange of the embodied data item and metadata with the DOM server.

Objects 1900 and 1920 have a correspondence to the Customer 1498 and Account 1592 folder-type message nodes, respectively, depicted and discussed in relation to FIGS. 14 and 15. These programming objects are also utility programming objects that support the work of primary application programming objects in representing a business object. Each of the folder utility objects facilitates the instantiation, population, organization, inventory, and exchange of primary application programming objects. Folder utility objects also participate in constructing a hierarchical topology by serving as a central point through which primary objects 162,164 belonging to the folder object 1920 are subordinated to the primary object 160 to which the folder object belongs.

The hierarchy of programming objects depicted in FIG. 19 is such as may be constructed from the data stream depicted and discussed earlier in relation to FIG. 18. When the data stream of FIG. 18 is, for example, transmitted from a DOM server to a client application program, a transmutation of the data stream components into programming objects, (objectization) occurs. The correspondence between data stream tokens and the programming objects extant after objectization is described next, followed by a procedural description of the objectization process in reference to FIG. 20.

Figure 20:
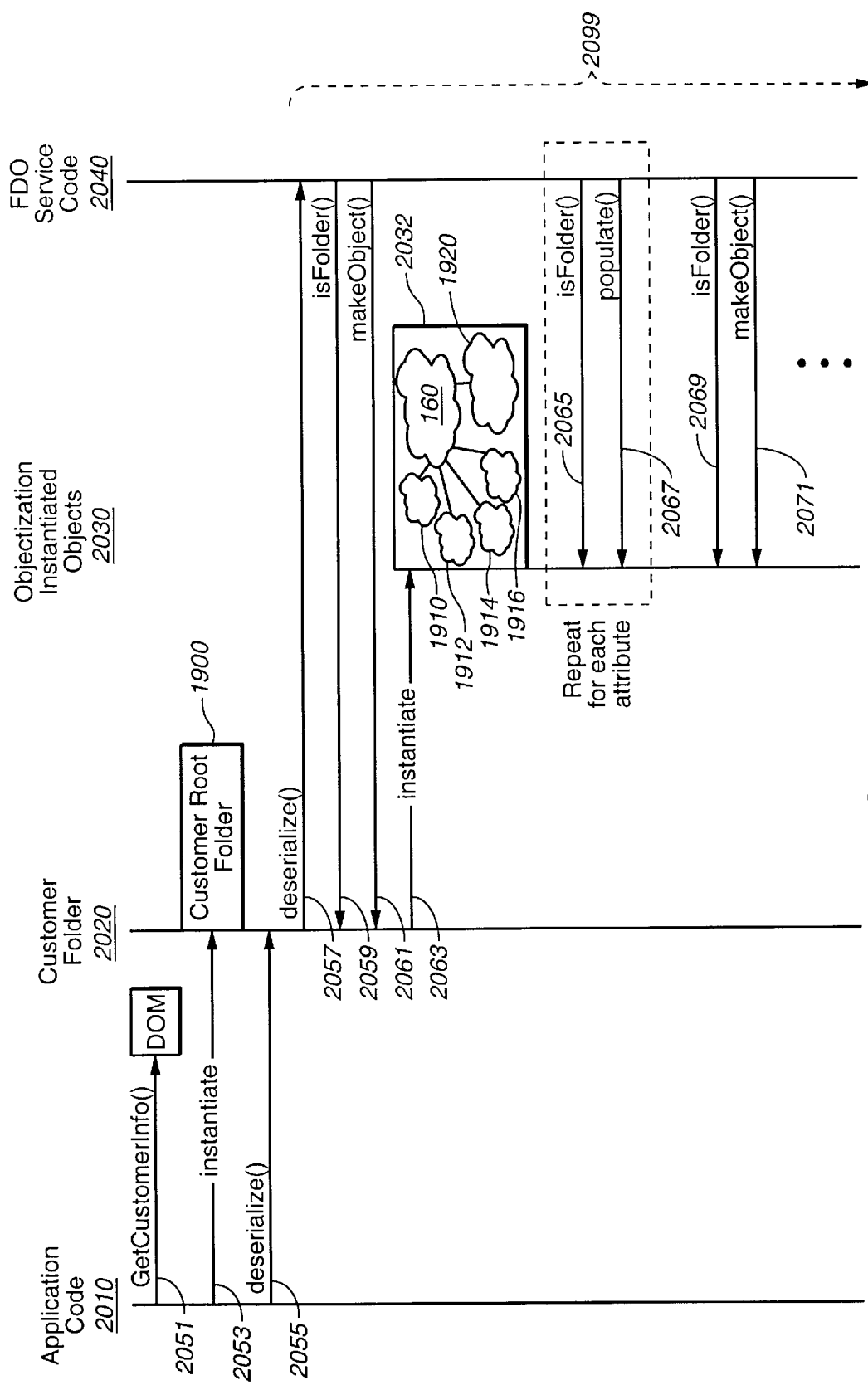
FIG. 20 is an interaction diagram showing an example of the processing in a client application program to request and objectize data items.

Data stream token 1800 of FIG. 18 corresponds to the entire collection of objects depicted in FIG. 19. Customer family-type token 1810 of FIG. 18 corresponds to Customer folder utility object 1900 of FIG. 19. Customer branch-type token 1820 of FIG. 18 corresponds to the entire collection of objects connected directly or indirectly via connection 1991 beneath Customer folder utility object 1900 of FIG. 19. Customer business object token 1840 of FIG. 18 corresponds to Customer primary object 160 of FIG. 19. Account family token 1850 of FIG. 18 corresponds to Account folder utility object 1920 of FIG. 19. Account branch-type token 1830 corresponds to the entire collection of objects connected directly or indirectly via connections 1993 and 1994 beneath Account folder utility object 1920 of FIG. 19. Account1 business object token 1860 of FIG. 18 corresponds to Savings Account primary object 162 of FIG. 19. Account2 business object token 1870 of FIG. 18 corresponds to Bankcard Account primary object 164 of FIG. 19. Representative leaf token 1871 of FIG. 18 corresponds to data item utility object 1948 of FIG. 19. FIG. 20 is an interaction diagram showing an example of the processing performed by a client application program to request and objectize data items. The illustrated steps show processing by an application program corresponding to steps 1708 and 1720 of the execution process described earlier in relation to FIG. 17. Specifically, step 2051 of FIG. 20, and steps 2053 through 2071 of FIG. 20, correspond to steps 1708 and 1720, respectively.

To facilitate an understanding of the processing performed by the application program in order to further appreciate the present invention, the application program processing depicted in FIG. 20 is directed at a specific example. FIG. 20 assumes an application program communicating with a DOM server using a configuration database configured as described earlier in relation to FIGS. 6 through 16. Particularly, FIG. 20 describes the request and objectization for a GetCustomerInfo CS transaction so configured. Further, a GetCustomerInfo CS transaction executed in accordance with FIGS. 6 through 16 results in communication of a CS transaction response message data stream from the DOM server to the application program. The GetCustomerInfo response data stream is constructed of tokens as depicted and described in relation to FIG. 18. Accordingly, references to tokens in the discussion that follows refer to FIG. 18.

FIG. 20 does not depict all of the steps in the objectization of the data stream depicted in FIG. 18. FIG. 20 depicts as much as is necessary to fully reveal the fundamental operation of the objectization process without unnecessary repetition. It is noted that complete objectization of the data stream depicted in FIG. 18 in accordance with the fundamental operation described in FIG. 20 would produce the complete object hierarchy depicted and described in relation to FIG. 19.

FIG. 20 graphically segregates the processing performed by user-written procedural logic in column 2010, the processing performed by user-declared and customized customer root folder object 1900 in column 2020, the processing performed by objects instantiated as a result of the objectization process in column 2030, and the processing performed by FDO generalized objectization service code in column 2040. Column 2040 represents program code incorporated into an application program from development library files such as library 252 as depicted and described earlier in relation to FIG. 2. Such program code may be physically incorporated into objects represented in columns 2020 and 2030, but is identified separately here in order to facilitate an understanding of the presently described embodiment.

Step 2051 of FIG. 20 shows user application code 2051 sending a CS transaction request to the DOM server. The request identifies GetCustomerInfo as the desired transaction. The request also includes an atmCardCode data item as required by the configuration for the GetCustomerInfo input message. The DOM server processes the request and returns a response message to user code 2010 in the form of data stream token 1800.

In step 2053, the application program prepares for objectization by instantiating a folder object to serve as the root for an object hierarchy. The application program expects a customer-rooted hierarchy out of the GetCustomerInfo transaction and so instantiates a folder object 1900 of customerFolder type.

In step 2055, user written program logic 2010 invokes the deserialize method of the customerFolder object 1900. The deserialize method is a request for objectization. User program logic includes data stream token 1800 as an input to the deserialize method.

In step 2057, the customerFolder object 1900 invokes FDO service code 2040 to deserialize the data stream token. From this point forward, FDO service code 2040 drives the objectization (deserialize) process. Bracket 2099 indicates the long lifetime of the FDO service code deserialize( ) function. While FDO service code drives the process, it enlists the help of other objects along the way. Notably, FDO service code will invoke the services of folder-type objects and primary-type objects to assist in forming and filling the portions of the object hierarchy they contain. This is illustrated in the steps that follow.

FDO service code 2040 progressively unpeels data stream token 1800 to proceed with objectization. In step 2059, FDO service code 2040 passes data stream token 1800 to CustomerFolder object 1900, with specific reference to family token 1810. The CustomerFolder object 1900 responds to the FDO service code 2040, indicating that it is aware of a folder-type object associated with the specifically-referenced token 1810.

Because of the affirmative response in step 2059, FDO service code 2040 turns around in step 2061 and instructs the CustomerFolder object 1900 to instantiate an object that can embody ensuing tokens in the data stream. FDO service code 2040 passes data stream token 1800 to CustomerFolder object 1900, with specific reference to token 1820. The CustomerFolder object 1900 unnests the tokens embedded within token 1820 to ultimately compile a list of the field types represented in the leaf tokens contained within business object token 1840. CustomerFolder object 1900 uses the compiled list of field types to determine that a Customer-type object should be used to embody the data items from token 1840. This object-type selection process is discussed in detail in reference to FIG. 21. Accordingly, CustomerFolder object 1900 instantiates Customer-type object 160 in step 2063. Instantiation of Customer object 160 causes instantiation of other objects in the hierarchy immediately depending from it, namely, leaf-type objects 1910–1916, and AccountFolder object 1920. CustomerFolder object 1900 passes the identity of newly instantiated Customer object 160 to FDO service code 2040, to conclude the makeObject( ) request of step 2061.

FDO service code continues to unpeel the tokens embedded in data stream token 1800. In step 2065, FDO service code 2040 passes data stream token 1800 to CustomerFolder object 1900, with specific reference to the first leaf token embedded in Customer business object token 1840. Customer object 160 responds to the FDO service code 2040, indicating that it is not aware of a folder-type object associated with the specifically-referenced token.

Because of the negative response in step 2065, FDO service code 2040 turns around in step 2067 and instructs the Customer object 160 to populate an object that embodies the subject leaf token from business object token 1840. Leaf object 1910 is populated with the data item and metadata from the subject leaf token. Steps 2065 through 2067 are repeated for each leaf token embedded within business object token 1840.

FDO service code continues to unpeel the tokens embedded in data stream token 1800. In step 2069, FDO service code 2040 passes data stream token 1800 to Customer object 160, with specific reference to family token 1850. Customer object 160 responds to the FDO service code 2040, indicating that it is aware of a folder-type object associated with the specifically-referenced token 1850.

Because of the affirmative response in step 2069, FDO service code 2040 turns around in step 2071 and instructs the AccountFolder object 1920 to instantiate an object that can embody ensuing tokens in the data stream. FDO service code 2040 passes data stream token 1800 to AccountFolder object 1920, with specific reference to token 1830. The AccountFolder object 1920 unnests the tokens embedded within token 1820 to ultimately compile a list of the field types represented in the leaf tokens contained within business object token 1860. Processing at this point proceeds after the fashion described in relation to step 2061. As FDO service code 2040 progressively unpeels the tokens in the data stream and iteratively and recursively makes and populates objects, the object hierarchy depicted in FIG. 19 is completely formed and filled. When the tokens of the data stream are exhausted, the FDO service code objectization process started at step 2057 completes. The user application program logic 2010 may then proceed to take full advantage of the object hierarchy and the data items it embodies.

Figure 21:
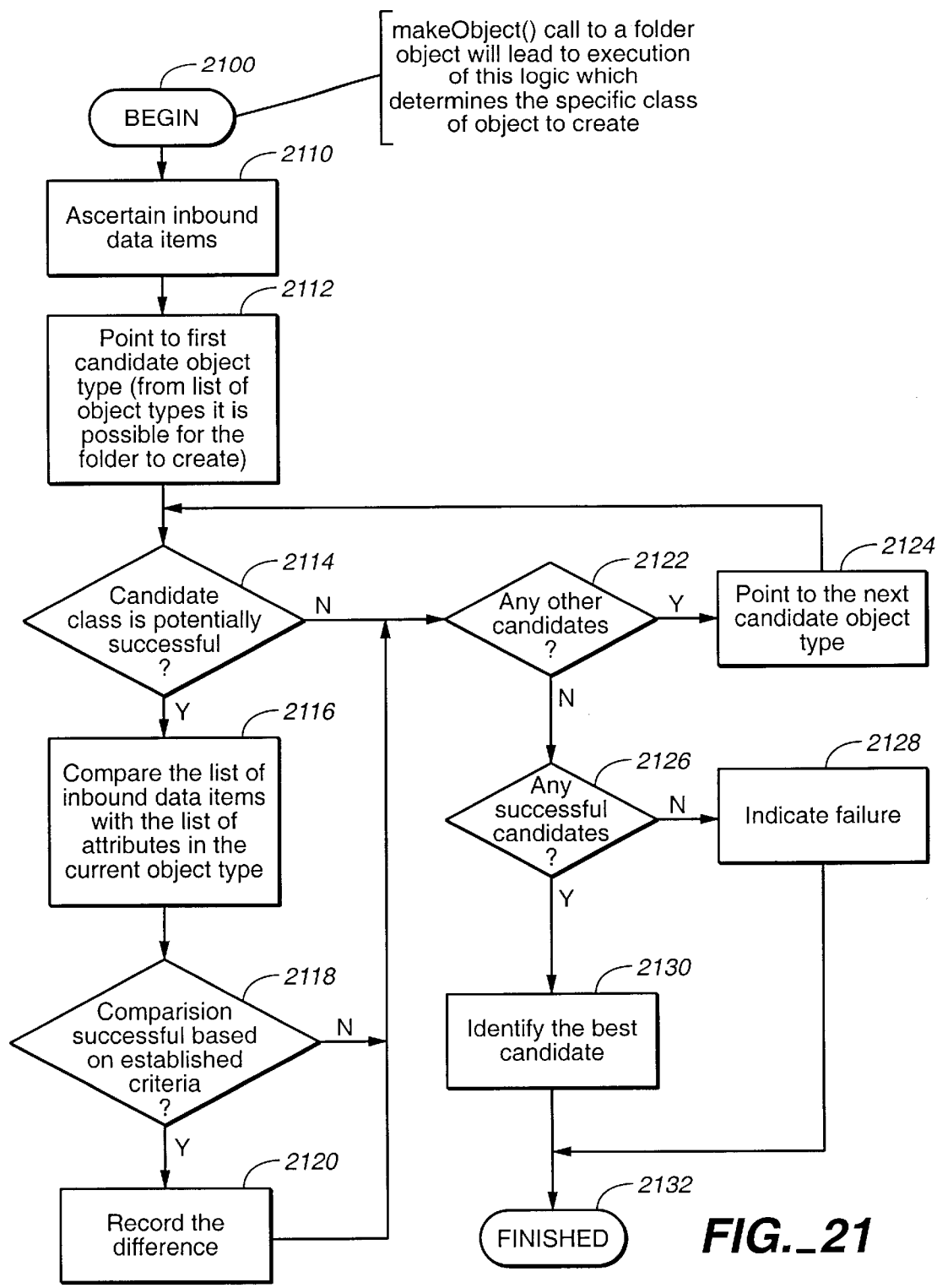
FIG. 21 is a flowchart showing an object-type selection process.

FIG. 21 is a flowchart showing an object-type selection process used by folder-type objects when processing a makeObject( ) request. This process was referred to earlier in reference to objectization process step 2061 of FIG. 20. In step 2110 of FIG. 21, the folder begins the object-type selection process by examining the data stream token contents to identify all of the data items contained therein for the primary object to be created. The number of data items may be less than the number of data items configured for the associated CS transaction output message, but can never be more. (This is because the list of data item elements in the output message represents the union of the sets of field types for all possible object types in the family.)

In step 2112, the folder sets up to perform a loop through all of the object types in the family by pointing to the first one. In step 2114, the folder performs a preliminary test to quickly ascertain whether the currently considered object type has the potential for success. This step is performed in one embodiment by comparing the number of inbound data items to the number of data items in an object of the currently considered object type. If it is greater, the currently considered object type is not "large" enough and processing proceeds to step 2122. If it is less than or equal, a detailed comparison of the field types in the inbound data stream and the field types (attributes) of the object type is made in step 2116. In step 2118, the folder then determines whether the comparison is successful. In the presently described embodiment, the comparison is successful if every inbound data item is represented in the attributes of the currently considered object type. If the comparison is unsuccessful, processing resumes at step 2122. If the comparison is successful, differences between the list of inbound data items and the list of object type attributes may be recorded in step 2120.

Step 2122 determines whether any other object types in the family remain to be considered. If so, step 2124 identifies the next candidate object type for consideration and processing loops back to step 2114. If not, processing continues at step 2126 where the folder determines whether any of the candidate object-types is a successful match. If not, failure is indicated in step 2128, object-type selection is finished and the report of failure is available for subsequent processing in step 2132. If any candidate has been successful, step 2130 determines the best candidate. In the presently described embodiment, the best candidate is the first successful object type in the list having the smallest number of attributes in excess of the number of field types in the inbound data stream. Once identified, step 2132 informs subsequent program logic of the object type to be used for primary object instantiation.

In an embodiment that supports multiphase object initialization, this same object-type selection process could be used to provide a best-fit object type for a primary object augmented by multiphase initialization with additional data items. In this case, step 2110 determines a list including not only inbound data items, but data items populated in the preexisting primary object, as well.

Figure 22:
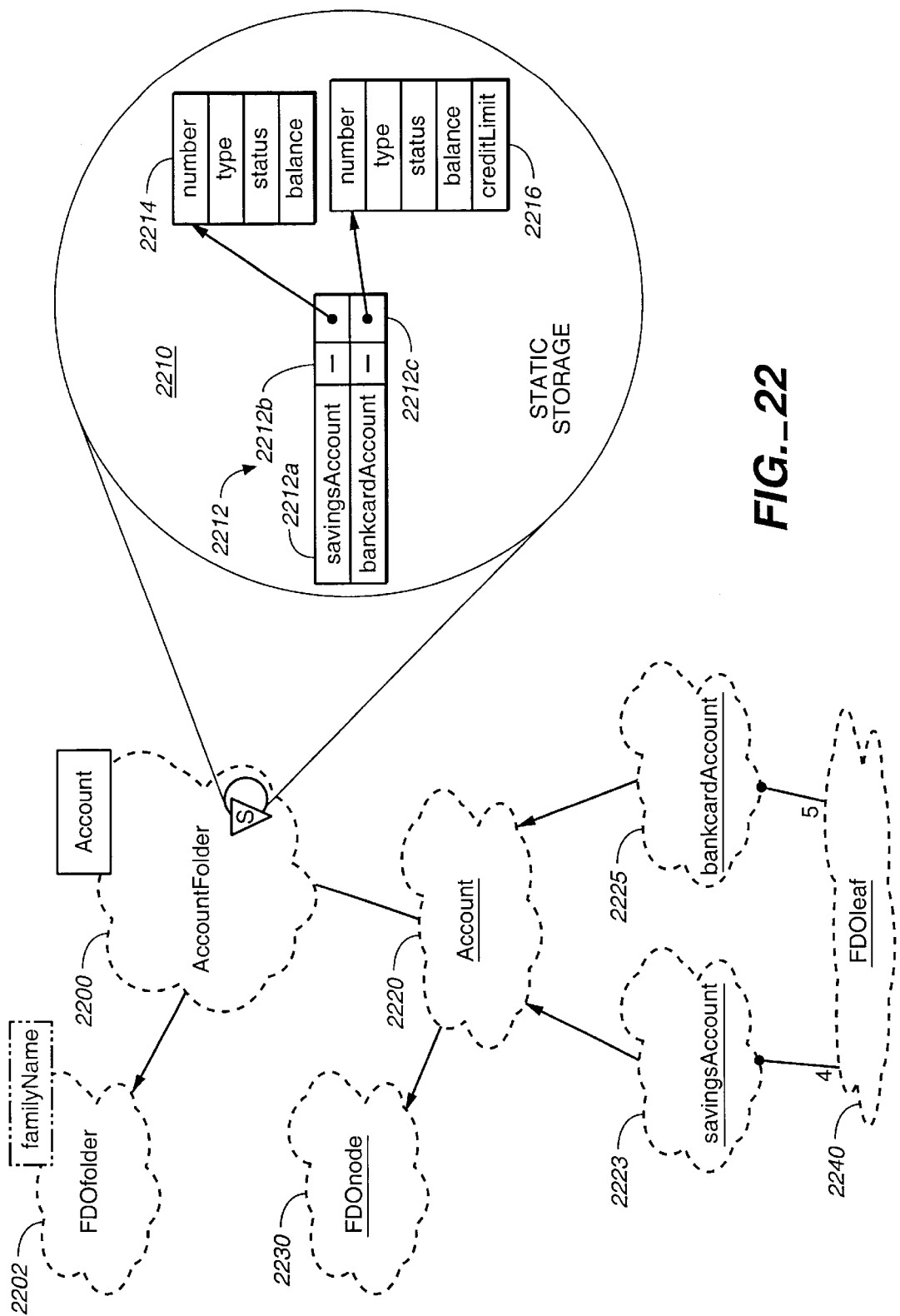
FIG. 22 is a class diagram including a folder class and family registration data.

FIG. 22 is a class diagram including a folder class and family registration data. This figure illustrates the class structure used in the presently described embodiment of a client application program to implement the exemplar savings account and bankcard account real-world entities in an object-oriented fashion. This class structure further illustrates support for the objectization process described in reference to FIGS. 20 and 21.

AccountFolder class 2200 is defined by the application programmer. An object oriented language such as C++ is used. The application programmer defines the AccountFolder class by coding an FDOfolder class template 2202 with the familyName parameter, "Account." In the presently described embodiment, source code representing the FDOfolder class template is contained within generalized development file libraries because a folder-type object lends itself to generalization, i.e., many different folder-type objects may be needed, all of which perform in the same way.

FDOfolder class template 2202 contains program code to perform the functions previously described for a folder-type object, including the object-type selection, instantiation and management of related primary objects. The application programmer implicitly or explicitly declares an AccountFolder as static, so that one AccountFolder is built into the executable version of the client program. The one AccountFolder in storage satisfies the needs for the entire client application program. The static AccountFolder serves as a repository for information about all of the object-types (classes) belonging to the family during program execution.

In this example, the AccountFolder includes family registration information 2210 about a savingsAccount family object-type and a bankcardAccount family object-type.

The application programmer defines Account class 2220. Account class 2220 serves the purposes of channeling the functionality of FDOnode class 2230 to classes deriving from it, via inheritance, and relating classes deriving from it to the static execution copy of AccountFolder 2200. The application programmer defines the Account class by coding a class declaration specifying inheritance from FDOnode class 2230. Code representing the FDOnode class is contained within generalized development file libraries in the presently described embodiment. FDOnode class 2230 includes program code that causes any inheriting class, e.g., 2220, to place certain information about itself into the family registration information of a related folder for program execution. In the presently described embodiments, definitions of data items with a static storage class achieve this objective. Declaration of the static storage class in source code causes the compiler to generate executable code in the prologue of the resulting program that populates the family registration data 2210 of the AccountFolder when the program first initializes. The operational charateristics of static storage data are well understood in the art.

The application programmer associates Account class 2220 to AccountFolder class 2200. The association may be made explicitly or may be made implicitly, e.g., by the common "Account" portion of the two class names.

The application programmer also specifically codes the declarations and definitions for savingsAccount class 2223 and bankcardaccount class 2225. These classes specialize generic Account class 2220, adding new object-types to the object-type family represented by AccountFolder class 2200. Class savingsAccount 2223 underlies execution object 162 shown in FIG. 19.

In the presently described embodiment, savingsAccount class 2223 definition includes code to incorporate leaf-type objects as data members of the class for number, type, status, and balance data items. The inclusion of the four leaf-type objects is depicted in FIG. 22 by the association shown between savingsAccount class 2223 and FDOleaf class 2240. The corresponding execution-time objects are shown by leaf objects 1930, 1932, 1934, and 1936 in FIG. 19, respectively.

Class bankcardAccount 2225 underlies execution object 164 shown in FIG. 19. In the present embodiment, bankcardaccount class 2225 definition includes code to incorporate leaf objects as data members of the class for number, type, status, balance, and creditLimit data items. The inclusion of the five leaf-type objects is depicted in FIG. 22 by the association shown between bankcardAccount class 2225 and FDOleaf class 2240. The corresponding execution-time objects are shown by leaf objects 1940, 1942, 1944, 1946, and 1948 in FIG. 19, respectively.

Family registration information 2210 depicts the execution-time contents for savingsAccount class 2223 and bankcardAccount class 2225. Family registration information 2210 may hold similar information for Account class 2220, itself, and any other classes deriving from it. Family registration information is principally used in the objectization process for selecting the type of object within the family to embody inbound data items from a data stream, as described earlier in reference to FIG. 21. Family registration data 2210 contains the list of candidate object-types and the data items (attributes) belonging to each. Table 2212 contains the list of candidate object-type names in column 2212a. For each candidate object-type name in column 2212a, column 2212c holds a pointer to a list of data item names belonging to the candidate object-type. The pointer in column 2212c for the savingsAccount object-type points to attribute name list 2214 containing the attributes names "number," "type," "status," and "balance." The pointer in column 2212c for the bankcardAccount object-type points to attribute name list 2216 containing the attributes names "number," "type," "status," "balance," and "creditLimit." When an object of AccountFolder type receives a makeObject( ) request during execution, the data item names contained in the "field type" tokens (e.g., 1872 of FIG. 18), embedded within the leaf-type tokens (e.g., 1871 of FIG. 18), embedded within the business object type token (e.g., 1870 of FIG. 18) presented with the makeObject( ) request, are compared against lists 2214 and 2216 of FIG. 22 by AccountFolder logic represented by process step 2116 of FIG. 21, to select the object-type for the programming object to embody the data items of the business object token (e.g., 1870 of FIG. 18). If exemplary business object token 1870 of FIG. 18, were to originate from the SINQ screen of SS transaction GetSavings depicted and described in relation FIG. 9, savingsAccount object-type will be chosen over bankcardAccount object-type because the list of data item types from the SINQ screen processing is an exact match to the list of attributes of the savingsAccount object-type. Because exemplary business object token 1870 of FIG. 18, originates from the BINQ screen of SS transaction GetBankcard depicted and described in relation FIG. 10, bankcardAccount object-type will be chosen over savingsAccount object-type because the list of data item types from the BINQ screen processing is an exact match to the list of attributes of the bankcardAccount object-type, and the attributes of the savingsAccount object-type are insufficient to contain the data items from the BINQ screen processing. These results are based on default object-type selection rules incorporated into the presently described embodiment.

As an alternative to the default object-type selection rules, the presently described embodiment provides for the application programmer to substitute custom object-type selection logic. The application programmer defines a function for each family object-type that receives at least the relevant business object-type token data from the data stream for its input, and provides as its response an indication whether it can embody the business object-type token data items. The application programmer incorporates code into the program to register each object-type selection function in column 2212b of family registration information 2210 alongside the name of the object-type to which the function relates. Functions must be registered for all or none of the family object-types listed in table 2212. If functions are registered, the object-type selection process of FIG. 21, is replaced with the object-type selection process depicted in FIG. 23. The use of functions to replace default object-type selection processing permits the selection of object-type using criteria other than the list of inbound field types alone. For example, the value of the field (i.e., the data item) in a particular instance of a message can factor into the determination of object-type; e.g., number fields beginning with "51" indicate a savingsAccount object. The flexibility in run-time object-type determination represents a further advantage of the present invention.

It is noted that numerous examples have been used throughout this detailed description to explain the operation of an embodiment employing the present invention. The discussion of the examples principally described data access operations for retrieving data from a data source, i.e., inquiry transactions. One skilled in the art recognizes the obvious modifications required of the examples shown to describe employment of the present invention for data access operations that add or update to a data source. In general, the flow of data items is reversed.

Various modifications to the preferred embodiment can be made without departing from the spirit and scope of the invention.

Thus, the foregoing description is not intended to limit the invention which is described in the appended claims in which:

1. An article of digital data storage media for use in a server computer mediating between object oriented computer application programs and disparate data sources, comprising:

instruction code for receiving a primary transaction request;

instruction code for correlating the received primary transaction request with a set of one or more secondary transaction requests;

instruction code for initiating communication of a one of said set of secondary transaction requests to a corresponding data source;

instruction code for receiving a result from said corresponding data source, wherein said result comprises data items related by said data source according to a first pattern;

instruction code for constructing a response to said primary transaction request using the received result, wherein said constructing includes relating a plurality of said data items according to a second pattern, said second pattern being independent of said first pattern; and instruction code for initiating communication of said response in reply to said primary transaction request.

2. The article of claim 1 wherein correlating the received primary transaction request with a set of one or more secondary transaction requests includes using a database having information about secondary transaction requests.

3. The article of claim 2 wherein the information about secondary transaction requests may include conditional processing logic.

4. The article of claim 2 further comprising instruction code for maintaining said database using a graphical user interface.

5. The article of claim 2 wherein relating a plurality of said data items according to a second pattern includes incorporating in said response information regarding a hierarchical topology stored as configuration data that relates the plurality of said data items.

6. The article of claim 5 wherein the information about secondary transaction requests may include conditional processing logic.

7. The article of claim 6 wherein initiating communication of each of said set of secondary transaction requests to a corresponding data source includes terminal emulation.

8. The article of claim 6 wherein initiating communication of each of said set of secondary transaction requests to a corresponding data source includes using a program-to-program protocol having formatted data areas for information exchange.

9. The article of claim 1 wherein relating a plurality of said data items according to a second pattern includes incorporating in said response information regarding a hierarchical topology stored as configuration data that relates the plurality of said data items.

10. The article of claim 9 wherein constructing a response to said primary transaction request further includes incorporating an indication of candidate object classes.

11. The article of claim 10 wherein constructing a response to said primary transaction request further includes incorporating an indication of an access permission relating to one or more of said data items.

12. The article of claim 11 wherein constructing a response to said primary transaction request further includes incorporating an indication of the state of the value of one or more of said data items relative to a persistent storage copy to which each data item corresponds.

13. A method for mediating service requests from an object oriented computer program executing on a client machine, comprising:

receiving a primary transaction request;

correlating the received primary transaction request with a set of one or more secondary transaction requests;

initiating communication of a one of said set of secondary transaction requests to a corresponding data source;

receiving a result from said corresponding data source, wherein said result comprises data items related by said data source according to a first pattern;

constructing a response to said primary transaction request using the received result, wherein said constructing includes relating a plurality of said data items according to a second pattern, said second pattern being independent of said first pattern; and initiating communication of said response in reply to said primary transaction request.

14. The method of claim 13 wherein correlating the received primary transaction request with a set of one or more secondary transaction requests includes using a database having information about secondary transaction requests.

15. The method of claim 14 wherein the information about secondary transaction requests may include conditional processing logic.

16. The method of claim 14 further comprising maintaining said database using a graphical user interface.

17. The method of claim 14 wherein relating a plurality of said data items according to a second pattern includes incorporating in said response information regarding a hierarchical topology stored as configuration data that relates the plurality of said data items.

18. The method of claim 17 wherein the information about secondary transaction requests may include conditional processing logic.

19. The method of claim 18 wherein initiating communication of each of said set of secondary transaction requests to a corresponding data source includes terminal emulation.

20. The method of claim 18 wherein initiating communication of each of said set of secondary transaction requests to a corresponding data source includes using a program-to-program protocol having formatted data areas for information exchange.

21. The method of claim 13 wherein relating a plurality of said data items according to a second pattern includes incorporating in said response information regarding a hierarchical topology stored as configuration data that relates the plurality of said data items.

22. The method of claim 21 wherein constructing a response to said primary transaction request further includes incorporating an indication of candidate object classes.

23. The method of claim 22 wherein constructing a response to said primary transaction request further includes incorporating an indication of an access permission relating to one or more of said data items.

24. The method of claim 23 wherein constructing a response to said primary transaction request further includes incorporating an indication of the state of the value of one or more of said data items relative to a persistent storage copy to which each data item corresponds.

25. A data processing apparatus for mediating service requests from an object oriented computer program executing on client machines, comprising:

means for receiving a primary transaction request;

means for correlating the received primary transaction request with a set of one or more secondary transaction requests;

source communicating means for initiating communication of a one of said set of secondary transaction requests to a corresponding data source;

means for receiving a result from said corresponding data source, wherein said result comprises data items related by said data source according to a first pattern;

means for constructing a response to said primary transaction request using the received result, wherein said means for constructing includes means for relating a plurality of said data items according to a second pattern, said second pattern being independent of said first pattern; and client communicating means for initiating communication of said response in reply to said primary transaction request.

26. The apparatus of claim 25 wherein the correlating means uses a database having information about secondary transaction requests.

27. The apparatus of claim 26 wherein the information about secondary transaction requests may include conditional processing logic.

28. The apparatus of claim 26 further comprising means for maintaining said database using a graphical user interface.

29. The apparatus of claim 26 wherein the means for relating a plurality of said data items according to a second pattern incorporates in said response information regarding a hierarchical topology stored as configuration data that relates the plurality of said data items.

30. The apparatus of claim 29 wherein the information about secondary transaction requests may include conditional processing logic.

31. The apparatus of claim 30 wherein the source communicating means performs terminal emulation.

32. The apparatus of claim 30 wherein the source communicating means uses a program-to-program protocol having formatted data areas for information exchange.

33. The apparatus of claim 25 wherein the means for relating a plurality of said data items according to a second pattern incorporates in said response information regarding a hierarchical topology stored as configuration data that relates the plurality of said data items.

34. The apparatus of claim 33 wherein the constructing means incorporates in said response an indication of candidate object classes.

35. The apparatus of claim 34 wherein the constructing means incorporates in said response an indication of an access permission relating to one or more of said data items.

36. The apparatus of claim 35 wherein the constructing means incorporates in said response an indication of the state of the value of one or more of said data items relative to a persistent storage copy to which each data item corresponds.

37. A data processing apparatus for mediating service requests from an object oriented computer program executing on a client machine, comprising:

a central processing unit; and a memory unit coupled to said central processing unit, comprising:

instruction code for receiving a primary transaction request;

instruction code for correlating the received primary transaction request with a set of one or more secondary transaction requests;

source communicating instruction code for initiating communication of a one of said set of secondary transaction requests to a corresponding data source;

instruction code for receiving a result from said corresponding data source, wherein said result comprises data items related by said data source according to a first pattern;

instruction code for constructing a response to said primary transaction request using the received result, wherein said constructing instruction code includes instruction code for relating a plurality of said data items according to a second pattern, said second pattern being independent of said first pattern; and client communicating instruction code for initiating communication of said response in reply to said primary transaction request.

38. The apparatus of claim 37 wherein the correlating instruction code uses a database having information about secondary transaction requests.

39. The apparatus of claim 38 wherein the information about secondary transaction requests may include conditional processing logic.

40. The memory unit of claim 38 further comprising instruction code for maintaining said database using a graphical user interface.

41. The apparatus of claim 38 wherein the instruction code for relating a plurality of said data items according to a second pattern incorporates in said response information regarding a hierarchical topology stored as configuration data that relates the plurality of said data items.

42. The apparatus of claim 41 wherein the information about secondary transaction requests may include conditional processing logic.

43. The apparatus of claim 42 wherein the source communicating instruction code performs terminal emulation.

44. The apparatus of claim 42 wherein the source communicating instruction code uses a program-to-program protocol having formatted data areas for information exchange.

45. The apparatus of claim 37 wherein the instruction code for relating a plurality of said data items according to a second pattern incorporates in said response information regarding a hierarchical topology stored as configuration data that relates the plurality of said data items.

46. The apparatus of claim 45 wherein the constructing instruction code incorporates in said response an indication of candidate object classes.

47. The apparatus of claim 46 wherein the constructing instruction code incorporates in said response an indication of an access permission relating to one or more of said data items.

48. The apparatus of claim 47 wherein the constructing instruction code incorporates in said response an indication of the state of the value of one or more of said data items relative to a persistent storage copy to which each data item corresponds.

49. A data processing system for processing data maintained by disparate data sources, using object oriented programs, comprising:

a client transactor layer for sending a primary transaction request, receiving a response to the primary transaction request, transmuting information from said response into programming objects, and for selecting the class of a primary application programming object from a set of candidate object classes based, at least in part, on information in said response, a client-server communication layer coupled to said client transactor layer for providing bidirectional communication;

a server processor layer coupled to said client-server communication layer for receiving, processing, and responding to primary transaction requests, wherein said processing includes identifying and requesting server-source transactions useful in satisfying the primary transaction request;

a resource adapter layer coupled to said server processor layer for receiving and communicating requests for server-source transactions;

a server-source communication layer coupled to said resource adapter layer for providing bidirectional communication;

a data accessor layer coupled to said server-source communication layer for supplying data from disparate sources in response to server-source requests communicated from said resource adapter layer; and wherein said responding of said server processor layer includes relating data items into said response according to a stored pattern that is independent of relationship patterns for said data items used by the data accessor layer.

* * * * *